United States Patent
Oayda et al.

(10) Patent No.: US 10,417,682 B2
(45) Date of Patent: Sep. 17, 2019

(54) RETAIL SYSTEM

(71) Applicant: BETWEEN THE FLAGS (AUST) PTY LTD, Pyrmont, NSW (AU)

(72) Inventors: Grant Oayda, Watsons Bay (AU); David John Lockwood, Bensville (AU); Dean Pham, Pyrmount (AU)

(73) Assignee: BETWEEN THE FLAGS (AUST) PTY LTD, pyrmont (AU)

( * ) Notice: Subject to any disclaimer, the term of this patent is extended or adjusted under 35 U.S.C. 154(b) by 572 days.

(21) Appl. No.: 14/894,474

(22) PCT Filed: Jun. 2, 2014

(86) PCT No.: PCT/AU2014/000572
§ 371 (c)(1),
(2) Date: Nov. 27, 2015

(87) PCT Pub. No.: WO2014/172757
PCT Pub. Date: Oct. 30, 2014

(65) Prior Publication Data
US 2016/0117744 A1  Apr. 28, 2016

(30) Foreign Application Priority Data

May 31, 2013 (AU) ................................ 2013901961
Feb. 14, 2014 (AU) ................................ 2014900464
(Continued)

(51) Int. Cl.
*G06Q 30/00*  (2012.01)
*G06Q 30/06*  (2012.01)
(Continued)

(52) U.S. Cl.
CPC ......... *G06Q 30/0617* (2013.01); *G06Q 20/12* (2013.01); *G06Q 20/18* (2013.01);
(Continued)

(58) Field of Classification Search
CPC ............ G06Q 30/0617; G06Q 30/016; G06Q 30/0222; G06Q 30/0237; G06Q 30/0253;
(Continued)

(56) References Cited

U.S. PATENT DOCUMENTS 6,529,940 B1 * 3/2003 Humble ................. G06Q 30/02
709/204
2002/0184104 A1 * 12/2002 Littman ................. G06Q 30/06
705/26.8
(Continued)

OTHER PUBLICATIONS

Oct. 2013—http://retail-innovation.com/foot-lockers-in-store-3d-virtual-shoe-customisation (Year: 2013).*
(Continued)

*Primary Examiner* — Matthew E Zimmerman
(74) *Attorney, Agent, or Firm* — MH2 Technology Law Group LLP

(57) ABSTRACT

A retailing system for providing interaction between a customer and a retailer to assist in the completion of a sale, comprising, a customer interface arranged to display to a customer information about at least one item, an input module arranged to receive input regarding a potential sale of the at least one item from the customer for provision to a database via a communications system, wherein the database is arranged to provide the input from the customer to at least one other user associated with the retailer on a retailer interface viewable by the at least one other user, wherein the at least one other user utilizes the interface to review the input and interact with the customer to assist in the completion of the sale.

10 Claims, 32 Drawing Sheets

(30) Foreign Application Priority Data

Mar. 21, 2014 (AU) .................................. 2014901003
Jun. 2, 2014 (AU) .................................. 2014100593

(51) Int. Cl.
*G06Q 20/18* (2012.01)
*G06Q 30/02* (2012.01)
*G06Q 20/12* (2012.01)
*G06Q 20/32* (2012.01)
*G06Q 20/38* (2012.01)

(52) U.S. Cl.
CPC ......... *G06Q 20/322* (2013.01); *G06Q 20/387* (2013.01); *G06Q 30/016* (2013.01); *G06Q 30/0222* (2013.01); *G06Q 30/0237* (2013.01); *G06Q 30/0253* (2013.01); *G06Q 30/0268* (2013.01); *G06Q 30/0635* (2013.01); *G06Q 30/0641* (2013.01)

(58) Field of Classification Search
CPC ........... G06Q 30/0268; G06Q 30/0635; G06Q 30/0641; G06Q 20/12; G06Q 20/18; G06Q 20/322; G06Q 20/387
See application file for complete search history.

(56) References Cited

U.S. PATENT DOCUMENTS

| | | | |
|---|---|---|---|
| 2005/0177463 A1* | 8/2005 | Crutchfield, Jr. ...... | G06Q 30/06 705/26.9 |
| 2007/0034694 A1* | 2/2007 | Jensen ...................... | G07F 9/02 235/439 |
| 2009/0204501 A1* | 8/2009 | Chen ........................ | G06Q 30/02 705/14.14 |
| 2010/0036670 A1* | 2/2010 | Hill .......................... | G06Q 30/016 705/304 |
| 2013/0006790 A1* | 1/2013 | Raskin ..................... | G06Q 10/04 705/26.1 |
| 2013/0117137 A1* | 5/2013 | Klein ....................... | G07F 17/16 705/16 |
| 2013/0254304 A1* | 9/2013 | Van Nest ................. | H04L 67/04 709/206 |

OTHER PUBLICATIONS

International Search Report dated Feb. 12, 2014 from Australian Patent Application No. 2013901961, pp. 1-6.

* cited by examiner

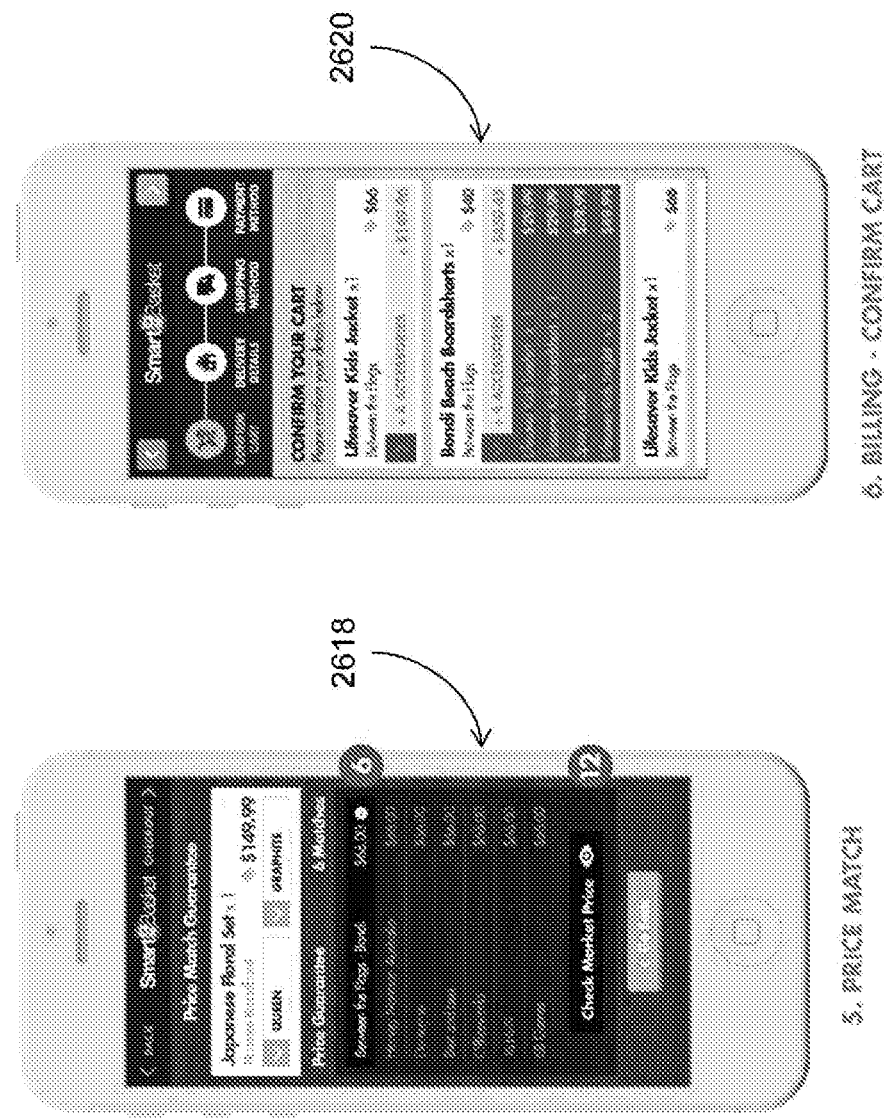

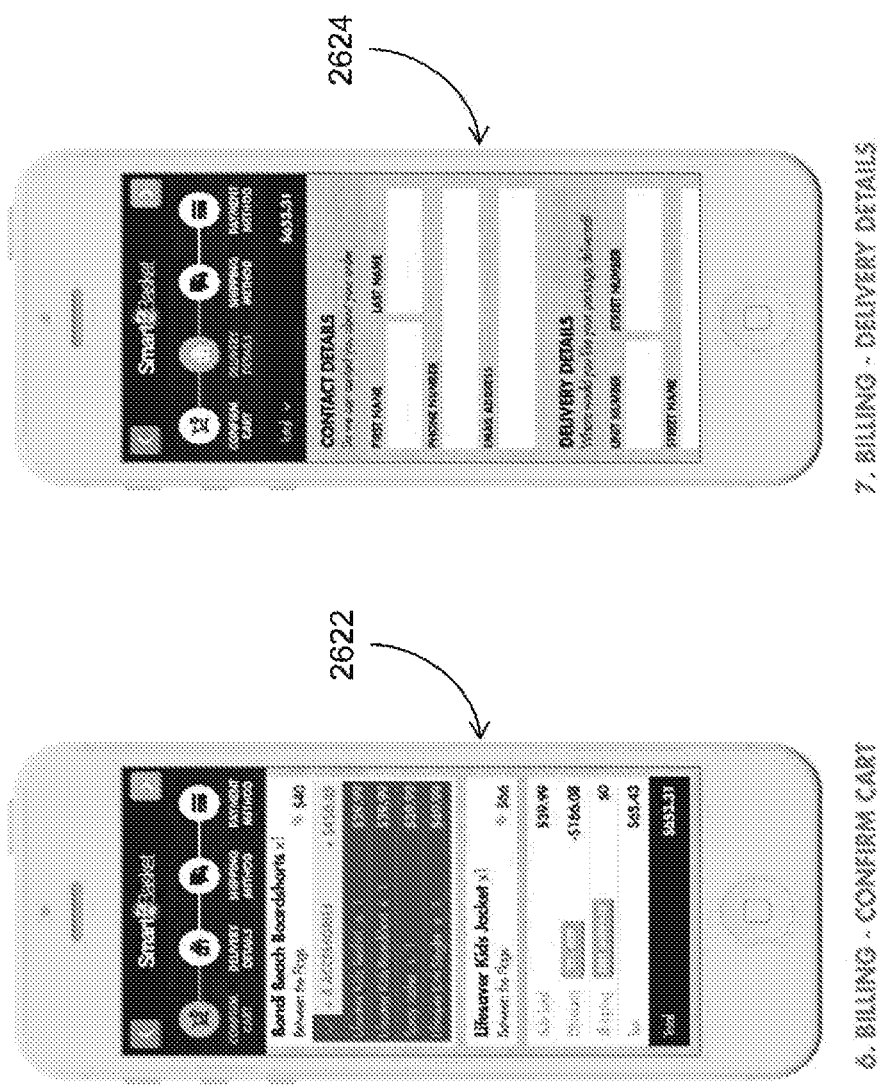

RETAIL SYSTEM

CROSS-REFERENCE TO RELATED APPLICATIONS

This application is a U.S. National Stage application of PCT/AU2014/000572 filed 2 Jun. 2014, which claims priority to Australian patent application 2013901961 filed 31 May 2013, Australian patent application 2014900464 filed 14 Feb. 2014, Australian patent application 2014901003 filed 21 Mar. 2014, and Australian patent application 2014100593 filed 2 Jun. 2014, the entire disclosures of which are hereby incorporated herein by reference in their entireties.

TECHNICAL FIELD

The present invention relates to a retail system that combines the advantages of online and personal shopping. It relates to an interactive kiosk system and/or an interactive website or software application that provides a retail solution for the retailer of goods or services while also building brand equity for the supplier. The retail system finds particular, but not exclusive, use in areas where floor space is at a premium, such as in retail outlets that would traditionally sell large and bulky goods and services. The system, in at least one embodiment, provides advantages that ameliorate issues with regard to sales, marketing, merchandising and logistics and may be easily utilised in existing traditional retail channels.

BACKGROUND TO THE INVENTION

In the past, retailing generally required physical retail premises, such as a shop or store, which held and displayed goods or provided information about services, which a customer could then select and purchase in the store. A customer enters the premises and usually select goods from shelves or displays, and carries them to a counter where a sales assistant will accept payment, and usually wrap the articles being purchased, which the customer will then carry from the store. Even when selling services, like in a travel agency for example, shops exist where customers can browse and select brochures and suchlike, before discussing their likely travel purchase with a sales assistant or travel agent, before having the assistant record the sale, accept payment, and pass over details of the travel arrangement selected and provide tickets to the customer.

These days such retail establishments are often computer aided, with retailers utilising computerised supply chain systems, and sometimes using delivery systems, to provide goods directly to the customer's home, especially with bulky items, for example. But the customers usually do not interact with a software assisted, or online, sales system within such shops or stores.

More recently there has been the rapidly developing "online retail" system, generally following the "Amazon"™ model, where customers shop via their home computers connected to retail sites located on the internet. In this arrangement, customers see images of the goods they may wish to buy, together with information about the goods or services involved. The customer typically registers their identification information at the online store. The user also provides a means of payment like a credit card or PayPal™ account, and records their address for shipping their purchases. After selecting the goods or services to be purchased, the customer agrees to the purchase, affirms the payment, and then some time later accepts the delivery of the physical goods that are shipped to their homes. Sometimes, when the purchase is a service or an electronic file like an airline ticket or e-Book, the item can be transferred directly to the user back over the internet.

However there are deficiencies with each of these retail methods, but there are advantages as well. It would therefore be useful if a new retailing system could be provided that avoids some of the disadvantages for each of these approaches, by using the advantages without the disadvantages. It would be even more useful if at least some the advantages from each of these different retail approaches could be combined into a single system.

The method of letting a customer purchase goods or services by visiting retail premises has many advantages. The customer is accustomed to this method, and often gains pleasure from shopping in this manner. The customer can inspect real samples of the goods or services and information about them. It helps to sell goods if the customer can see and touch the goods directly. Clothing can be tried on to determine that is the correct size. Whereas purchasing these same items via a computer over the internet only permits the customer to see photographs or a description of the item, and just from these, the customer is often uncertain or even suspicious about the quality, size, texture, weight or other attributes of the physical goods.

On the other hand, an advantage of online retailing is that the customer is often able to access a much wider range of products, including many different models, options and sizes. Since the products available to purchase are just provided as images, the actual goods remain in warehouses until they are purchased and delivered, making the system more cost effective. Whereas with purchasing goods in a shop, the size of the premises has to be large enough to hold all the different models, styles, and sizes for the goods that customers might be interested in buying. There is a practical limit to this, and so retail premises usually only stock a smaller range for the goods than would be available with online retailing, where every possible variation for the goods or services being presented to the customer can in theory be provided, as the user merely sees electronic representations that do not take up appreciable space.

With physical retailing there are overheads that the shop keeper must pay, such as rent for the premises and salaries for sufficient sales people, which increase and correlate with the quantity of different goods being made available for purchase. These additional costs are often not necessary or are much less with online retailing.

Retail premises usually have at least some sales assistants available to help customers. A good salesperson can increase sales by using persuasion as well as providing helpful assistance to the customer. While online retailing can also make a salesperson available, normally using a microphone and speaker, or via text messaging, or video interaction, this always lacks the personal touch that helps with the sales when the salesperson is dealing directly and personally with the customer. A remotely located sales assistant, which is the only arrangement possible for online retailing, cannot handle the goods, or know clearly what the customer is experiencing when the product is being selected and a purchase choice is being made, and is therefore at a disadvantage.

Accordingly, it would be useful to provide a solution that preferably avoids or ameliorates any one or more of the disadvantages present in the prior approaches to retail, or which may provide another alternative to such approaches.

SUMMARY OF THE INVENTION

According to one aspect of the invention, there is provided a retailing system for providing interaction between a customer and a retailer to assist in the completion of a sale, comprising, a customer interface arranged to display to a customer information about at least one item, an input module arranged to receive input regarding a potential sale of the at least one item from the customer for provision to a database via a communications system, wherein the database is arranged to provide the input from the customer to at least one other user associated with the retailer on a retailer interface viewable by the at least one other user, wherein the at least one other user utilises the interface to review the input and interact with the customer to assist in the completion of the sale.

The customer interface may be an interactive kiosk and/or a remote device under the control of the customer.

The interaction of the at least one other user with the customer may include manipulating the sale price of an item as viewed by the customer.

The interaction of the at least one other user with the customer may include communicating at least one incentive to the customer in order to induce the customer to complete the sale.

The system may include a processing module arranged to receive the input from the customer and processes the input to provide analysis information derived from the customer input, wherein the analysis information is presented on the retailer interface.

The processing module may further access the database to retrieve sale information relevant to the at least one item, wherein the processing module processes the sale information to provide further analysis information, wherein the further analysis information is presented on the retailer interface.

The further analysis information may include a gross margin associated with the at least one item selected by the customer.

According to another aspect of the invention there is provided a retailing system for increasing the total sales for a retail premises selling a multiplicity of products, by providing to a customer within the retail premises, a system comprising:

at least one interactive kiosk in close association with:
(a) a display of samples of at least some of said multiplicity of products,
(b) said kiosk being in communication with a database maintained on a computer system, the database containing information about said products;
said interactive kiosk having:
(a) at least one display means adapted to display to a customer some information about at least some of said products,
(b) means for accepting input from said customer, so as to permit the customer to manipulate the display to allow the customer to view the information from (a) for at least one of the products,
(c) means for the customer to choose one or more products that the customer wishes to purchase, by the allowing customer to provide some input for (b),
(d) means for accepting payment for the products from customers,
(e) means for entering identification details of said customer,
(f) means for accepting delivery details for the delivery of the purchased products, and
(g) means for connecting the kiosk with the database via a communications system (such as the internet);
wherein said database has:
(a) means to record the details purchases made by the customer, at least some of these details being input by the customer via the kiosk,
(b) means to communicate with a supplier of the goods or services so purchased, and to place an order to supply them,
(c) means to record the financial details of the purchase, and
(d) means to disburse the amounts payable to the supplier for supplying the goods or services once they are supplied to the customer, and
(e) means to disburse the amounts payable to the retailer for retailing the goods or services once they are supplied to the customer; and
wherein said samples of the products relate to at least some of the same products available for display and purchase using the kiosk, this display being readily accessible to the customers using the kiosk.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 1 show one version of the interactive kiosk according to the invention, where

FIG. 2 show an alternate version of the interactive kiosk, where FIG. 3 show yet another version of the interactive kiosk, comprising three modules, where

Figure 4:
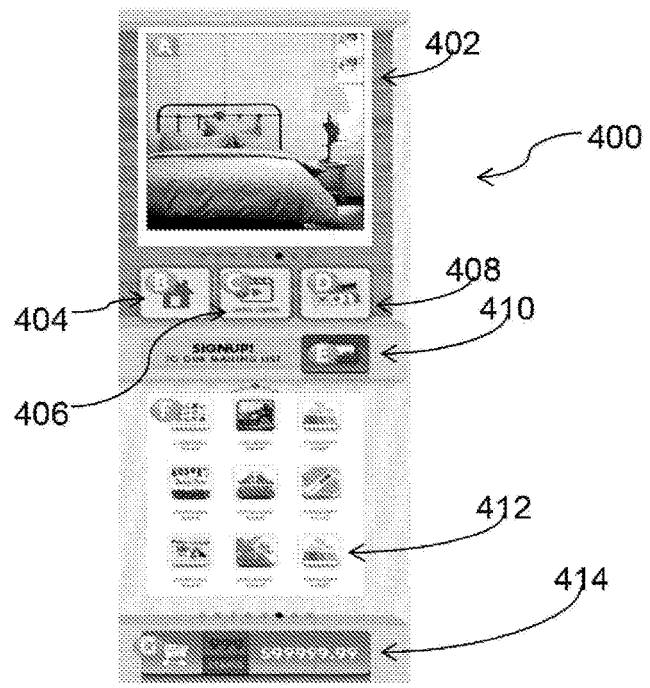
Figure 5:
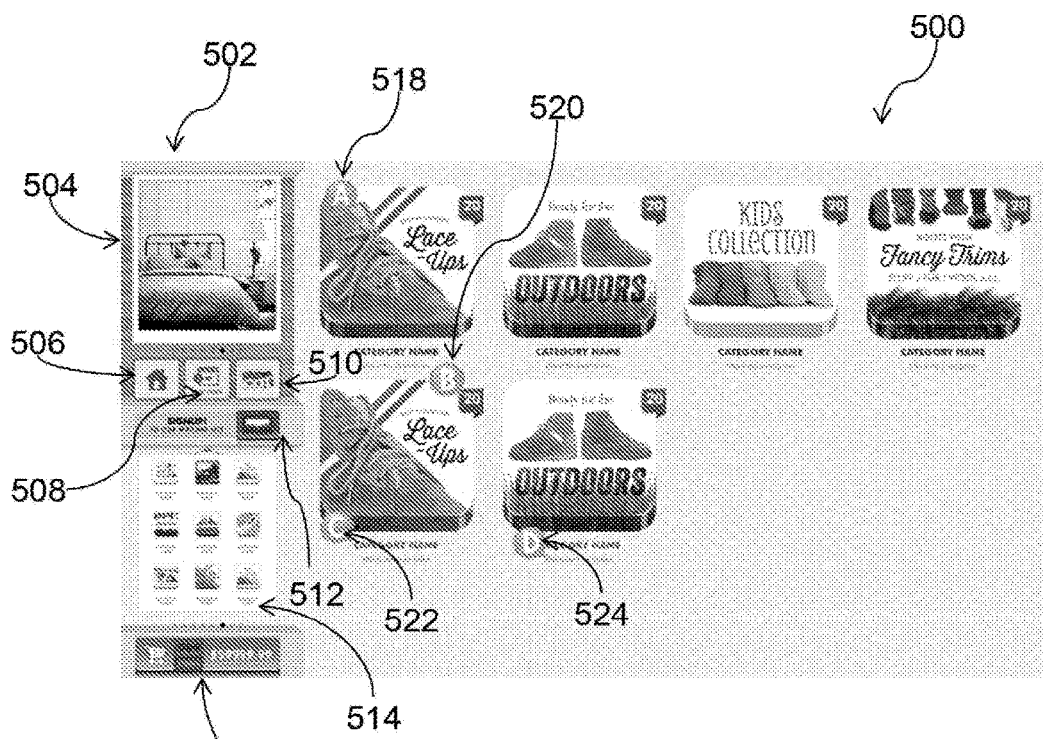
Figure 6A:
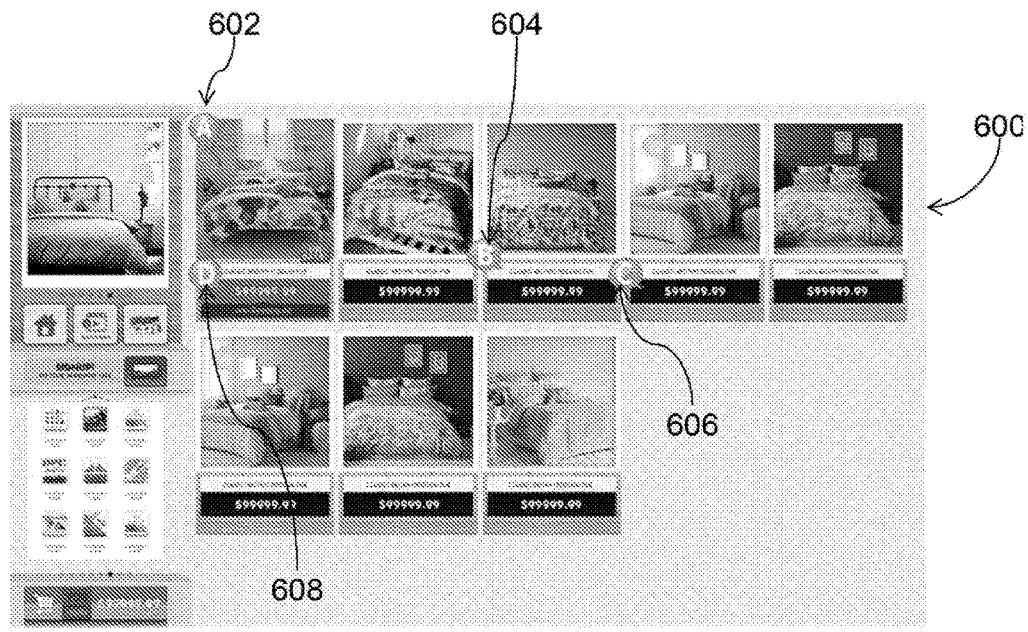
Figure 6B:
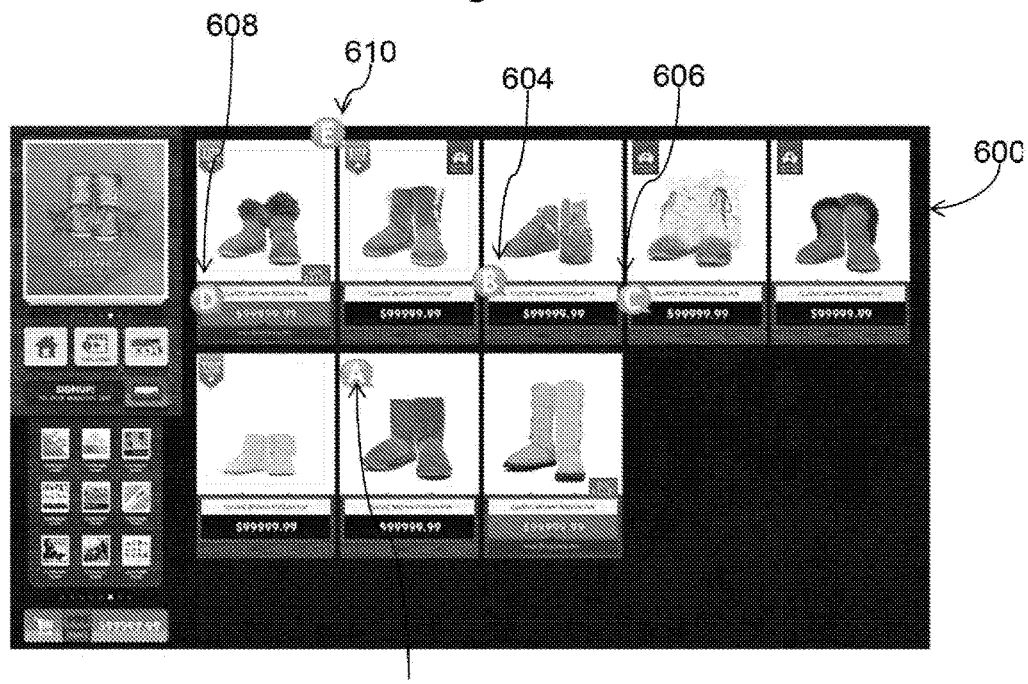
Figure 7A:
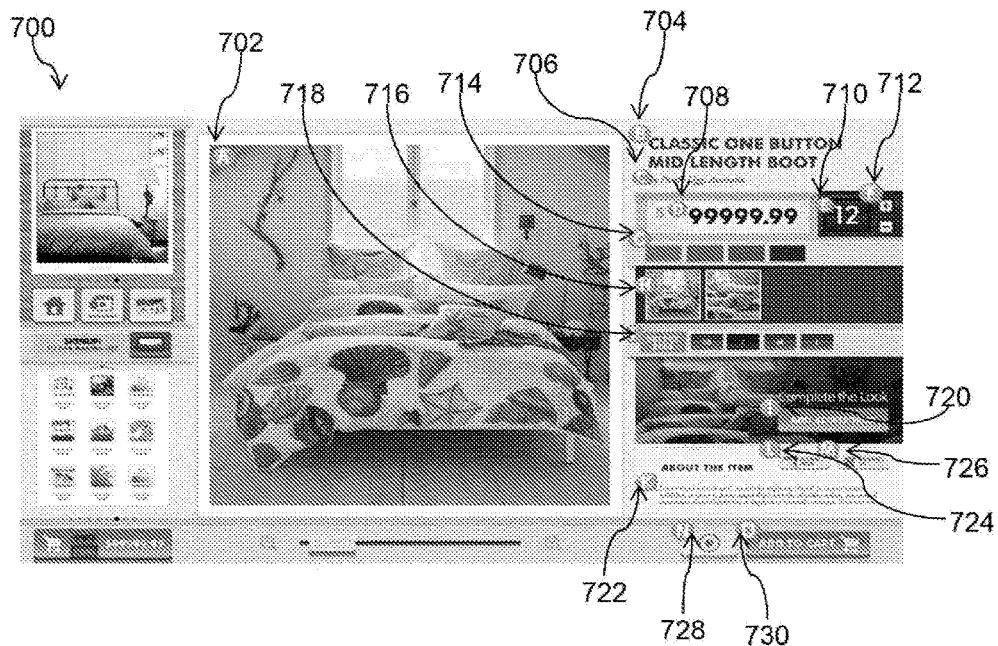
Figure 7B:
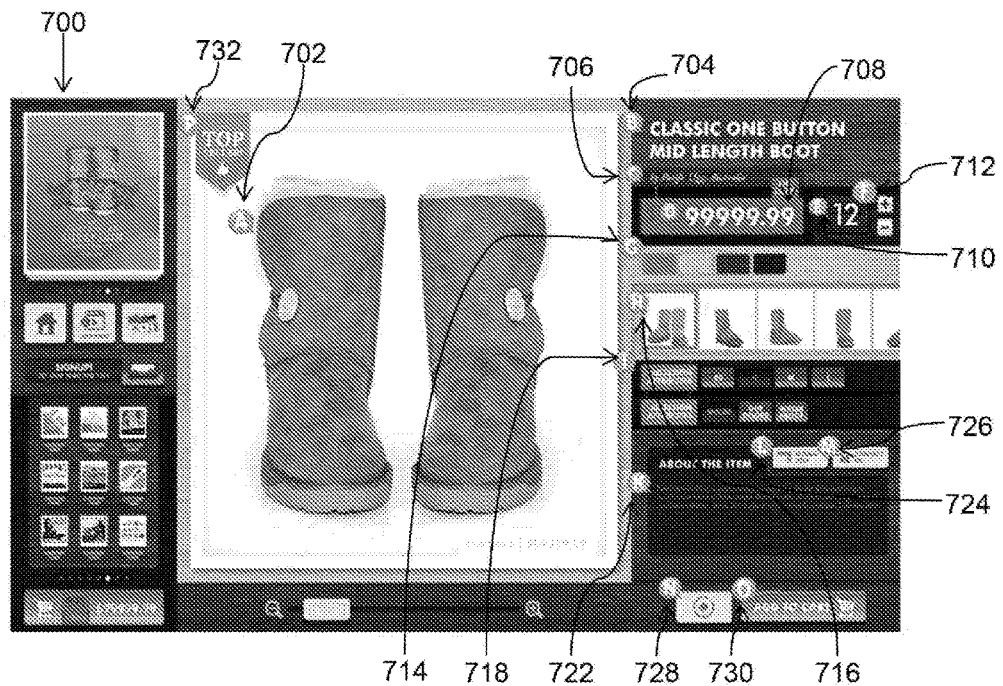
Figure 8A:
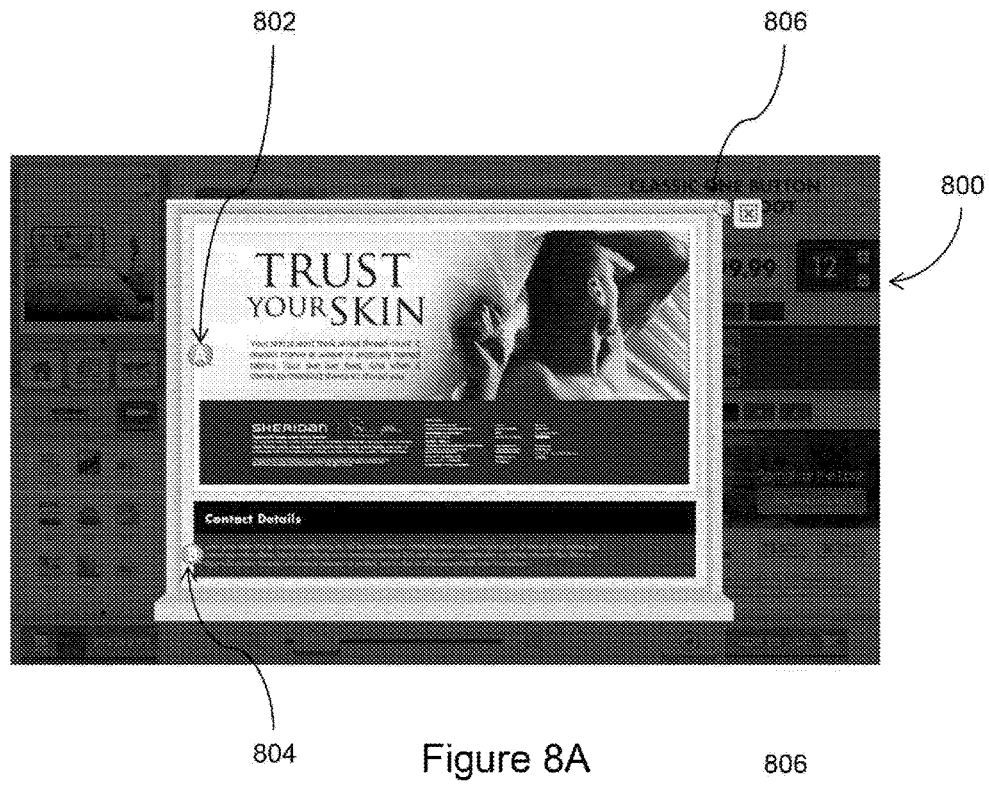
Figure 8B:
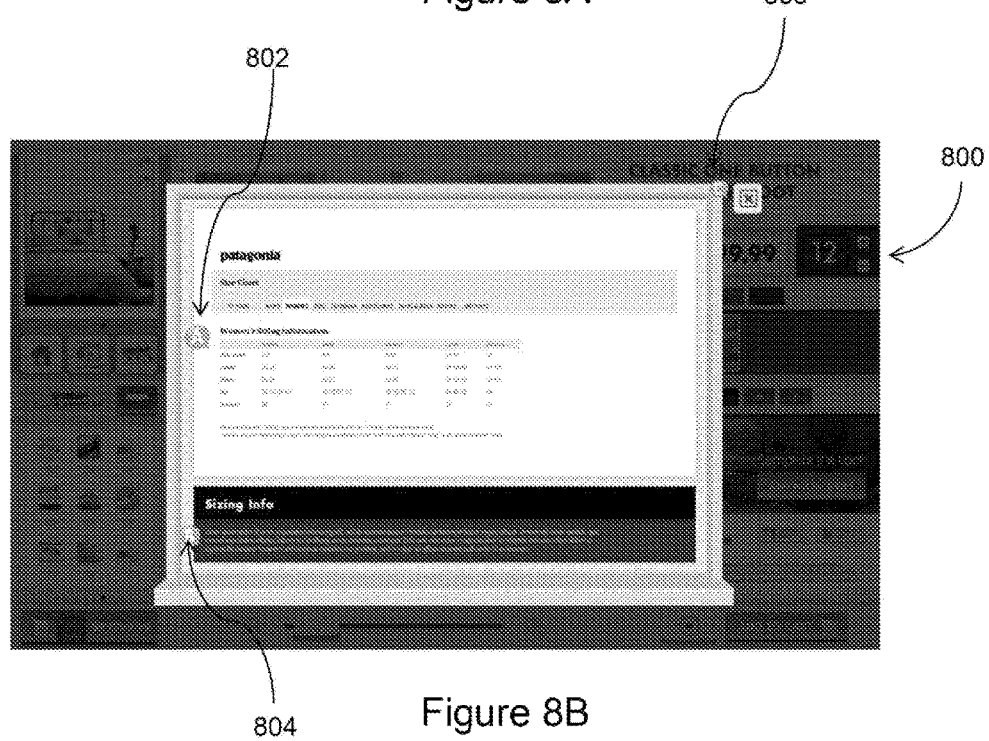
Figure 9:
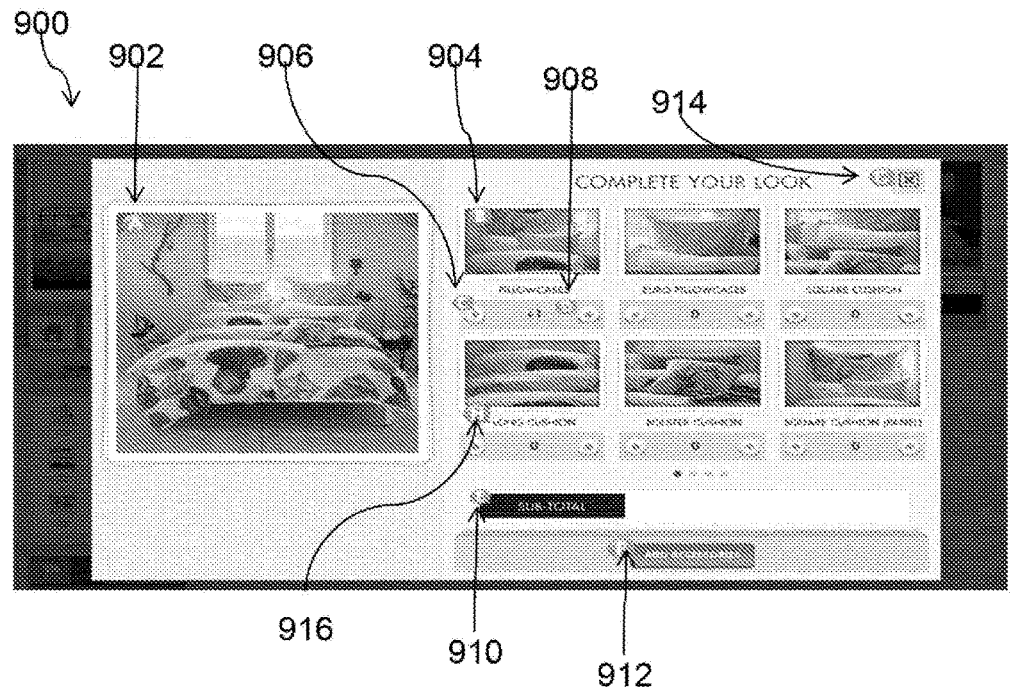
Figure 10A:
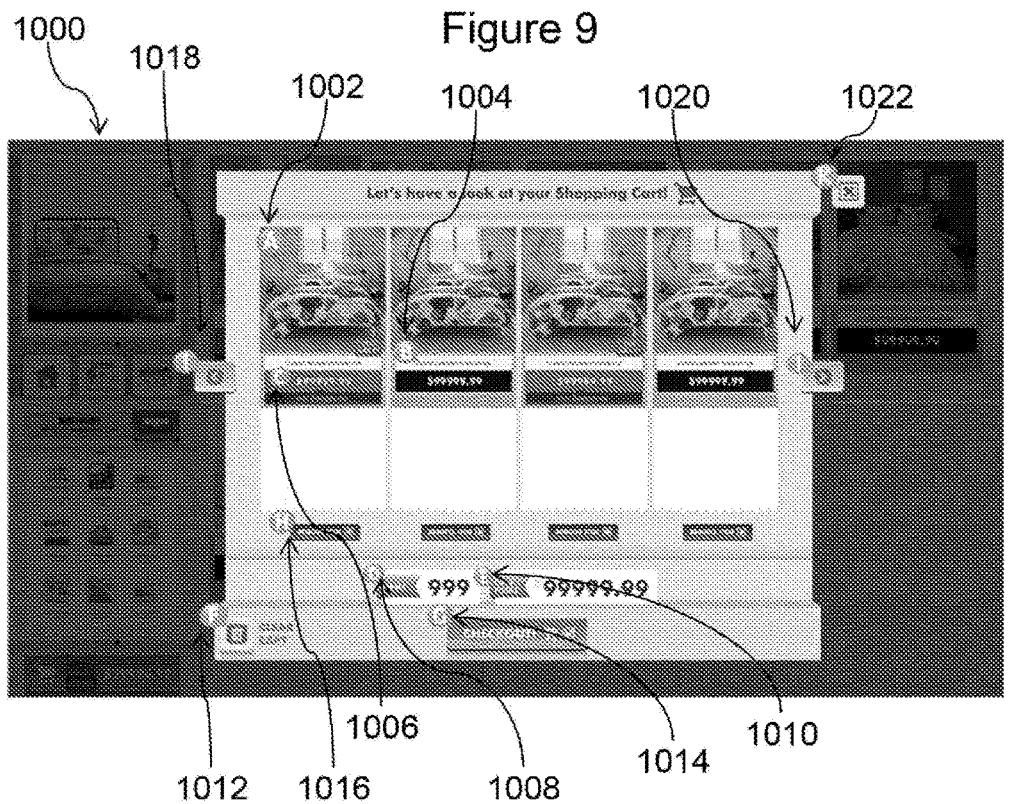
Figure 10B:
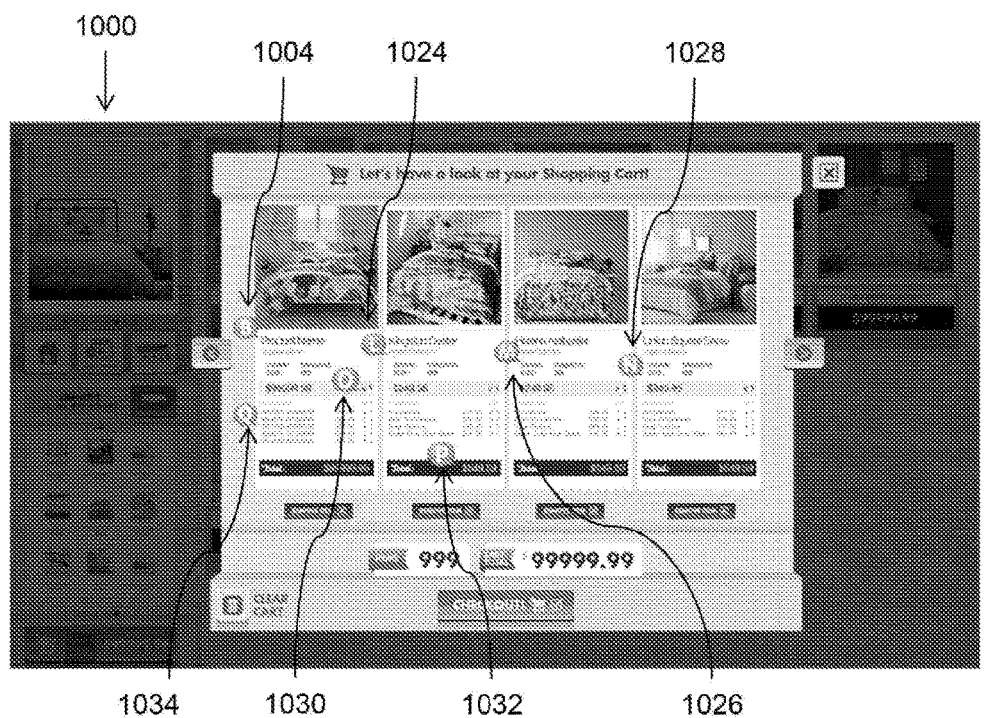
Figure 11A:
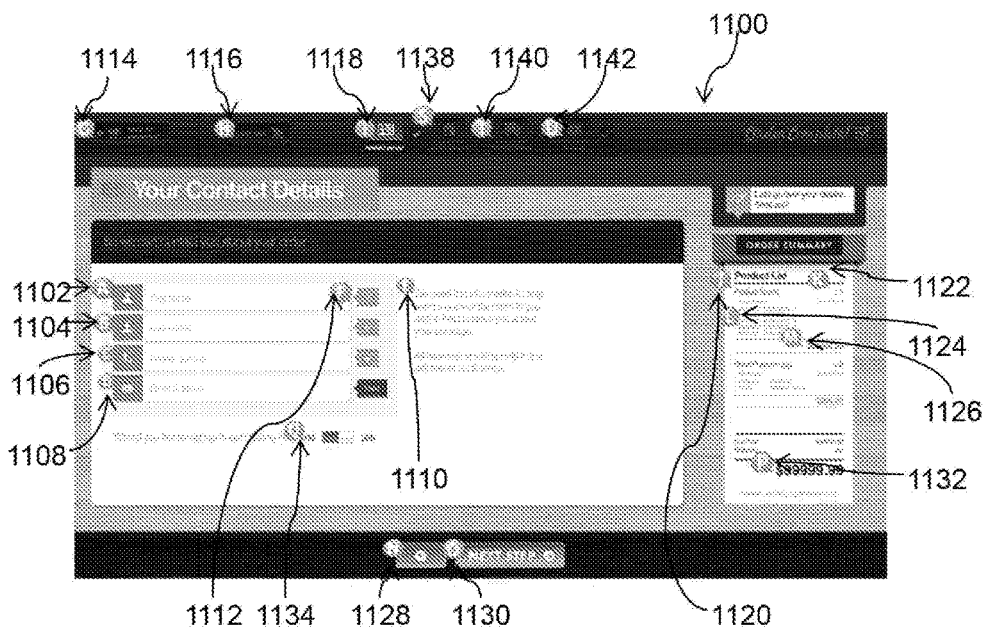
Figure 11B:
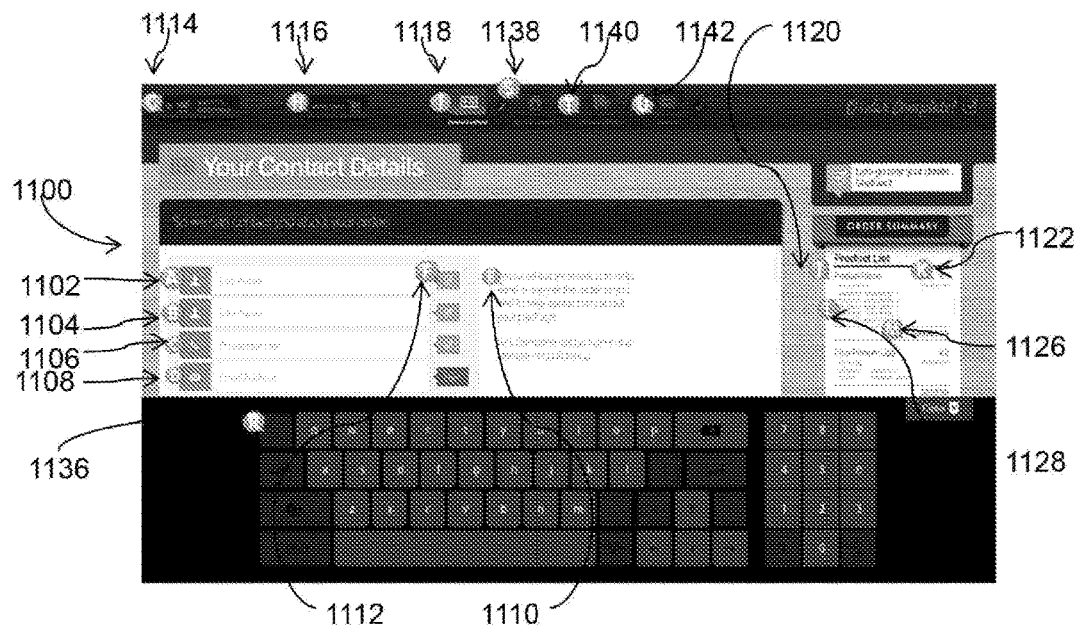
Figure 12:
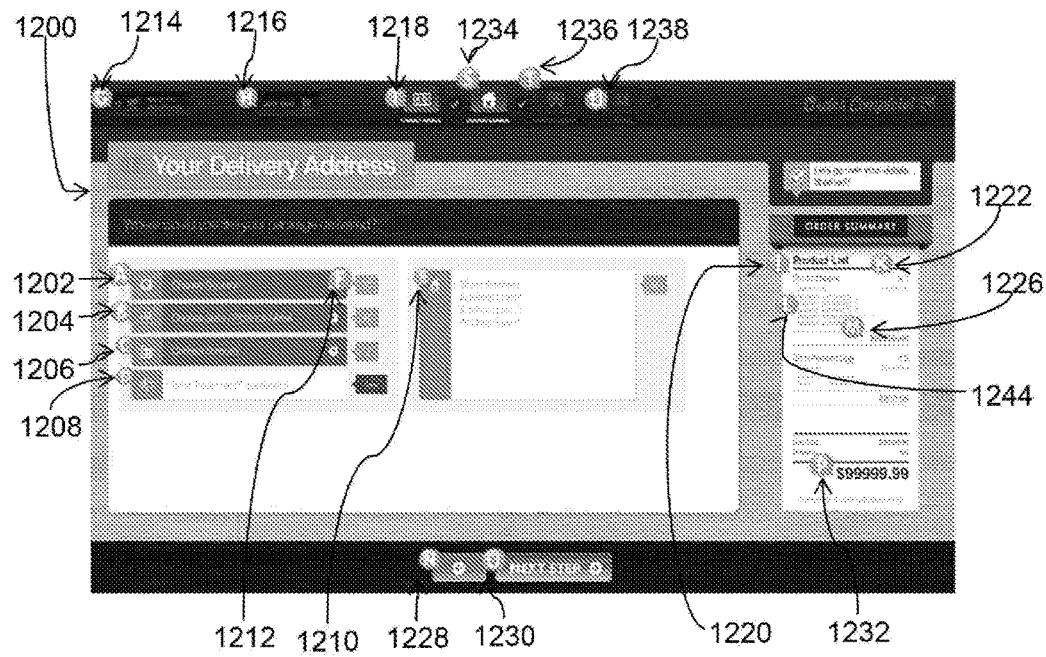
Figure 13:
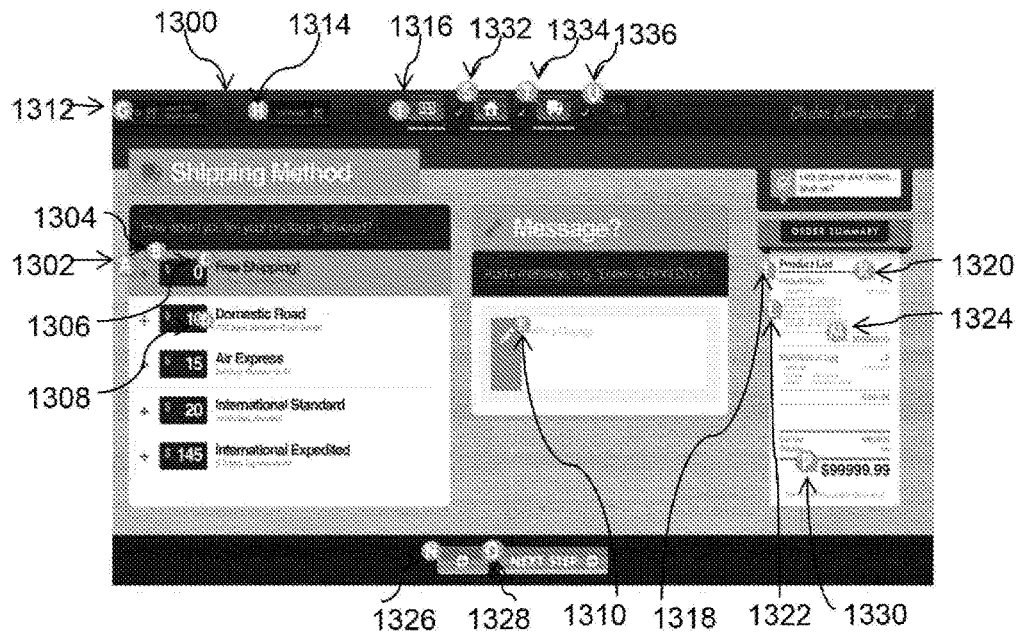
Figure 14:
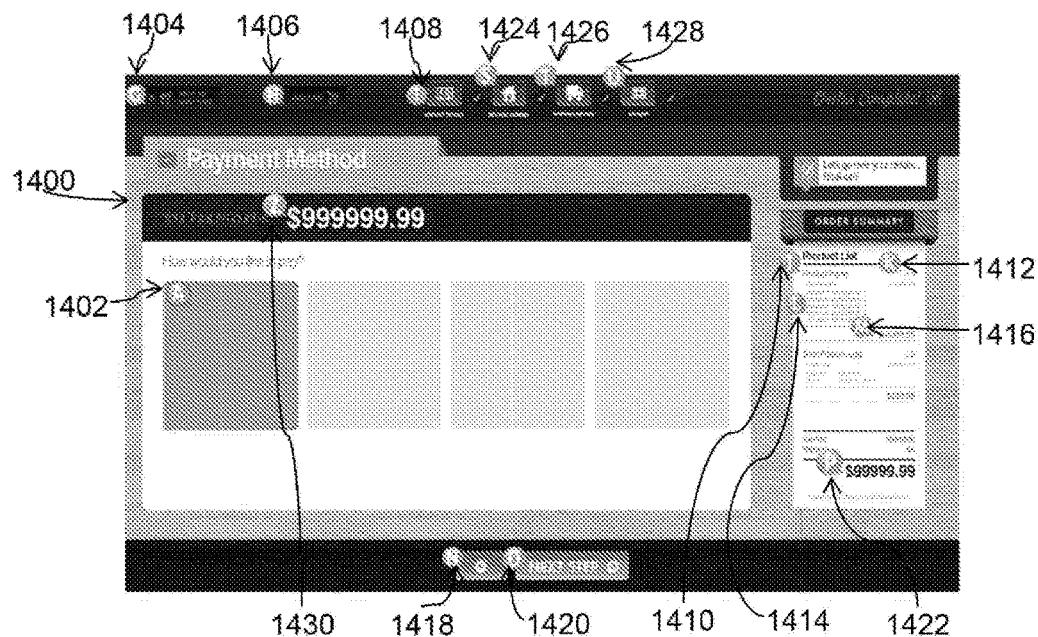
Figure 15:
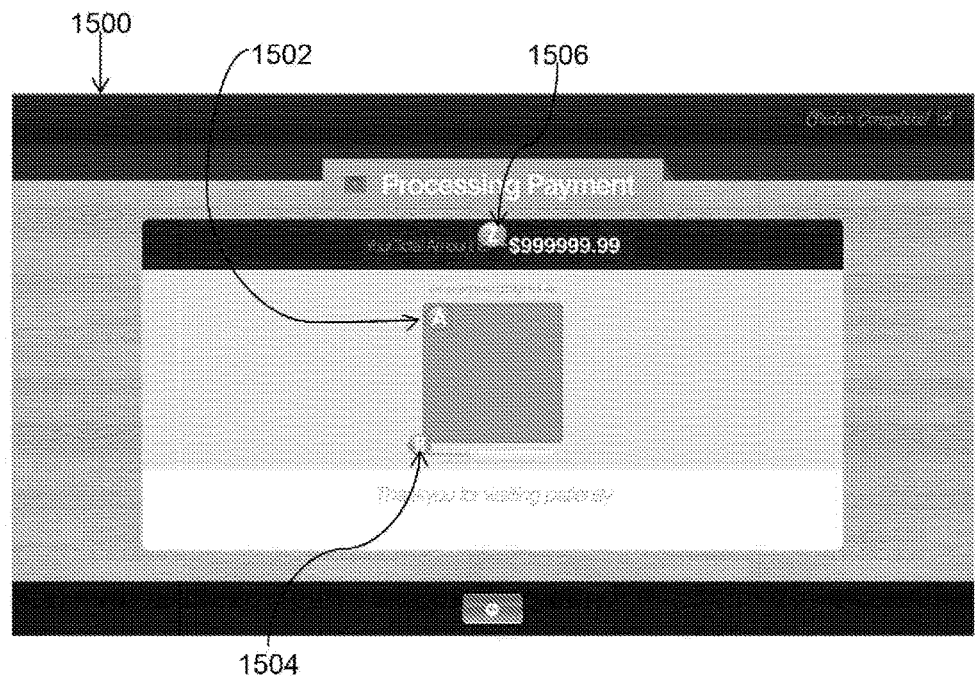
Figure 16:
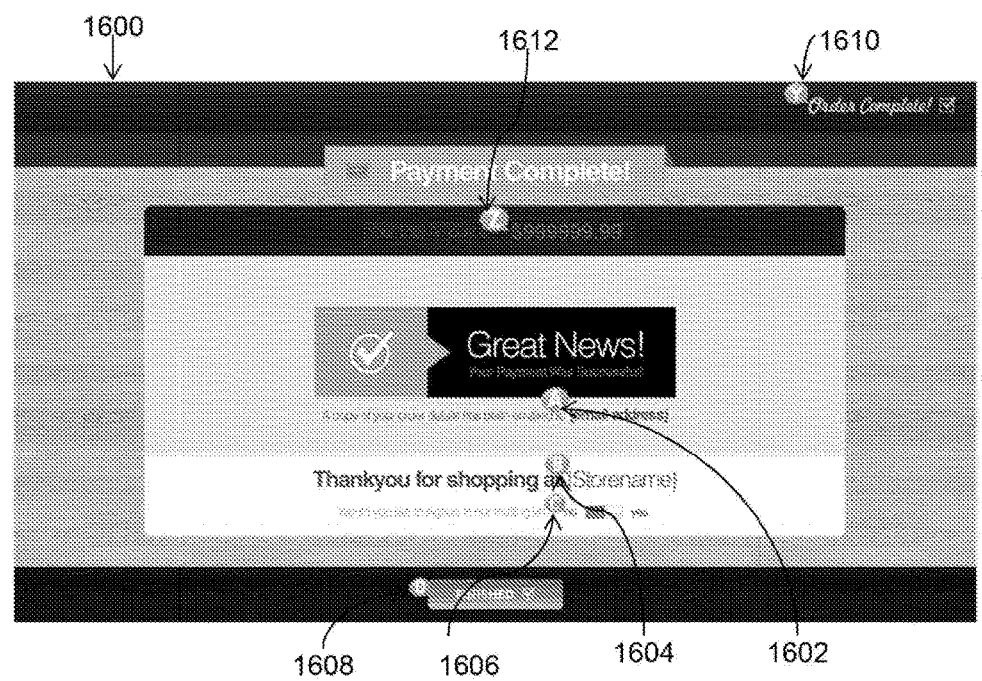
Figure 17:
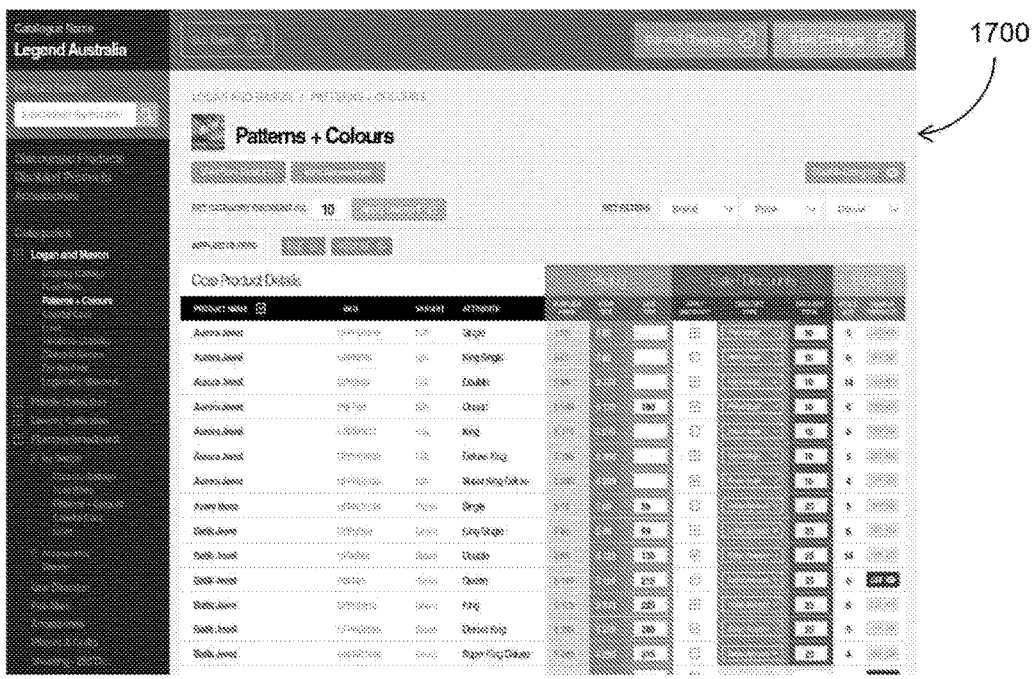
Figure 17A:
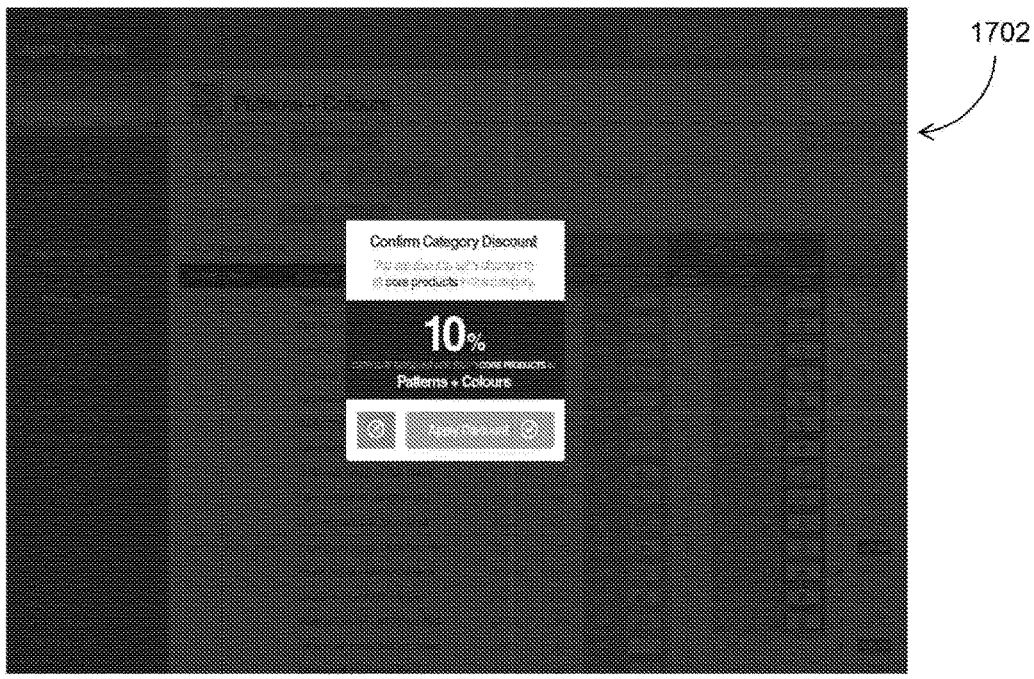
Figure 18:
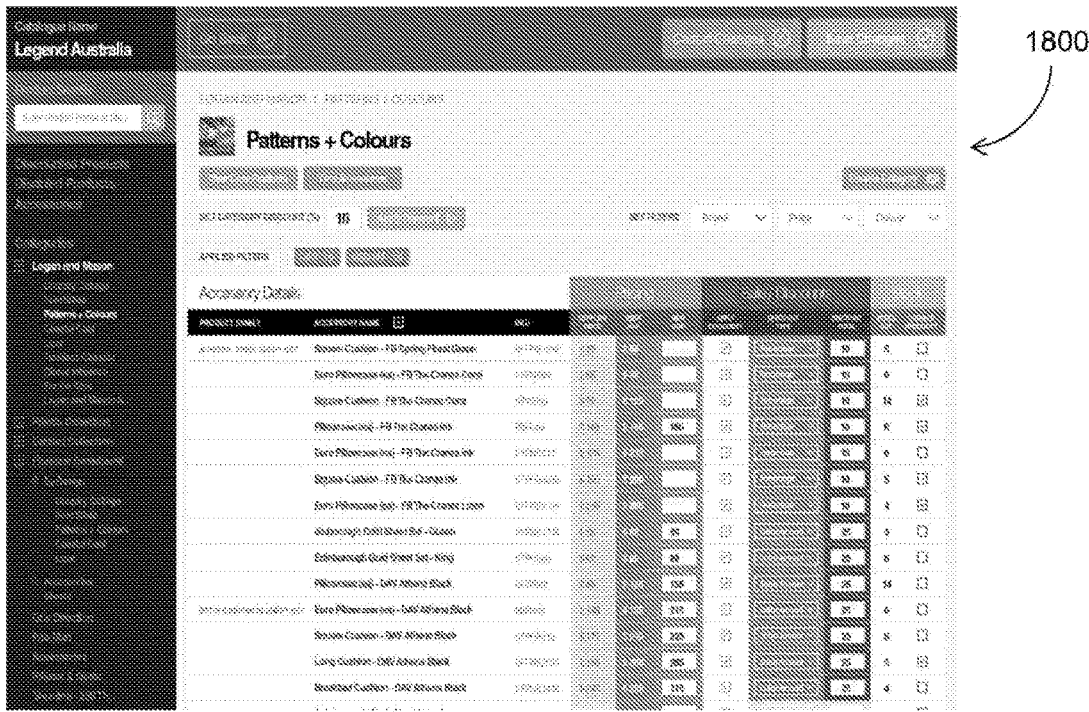
Figure 18A:
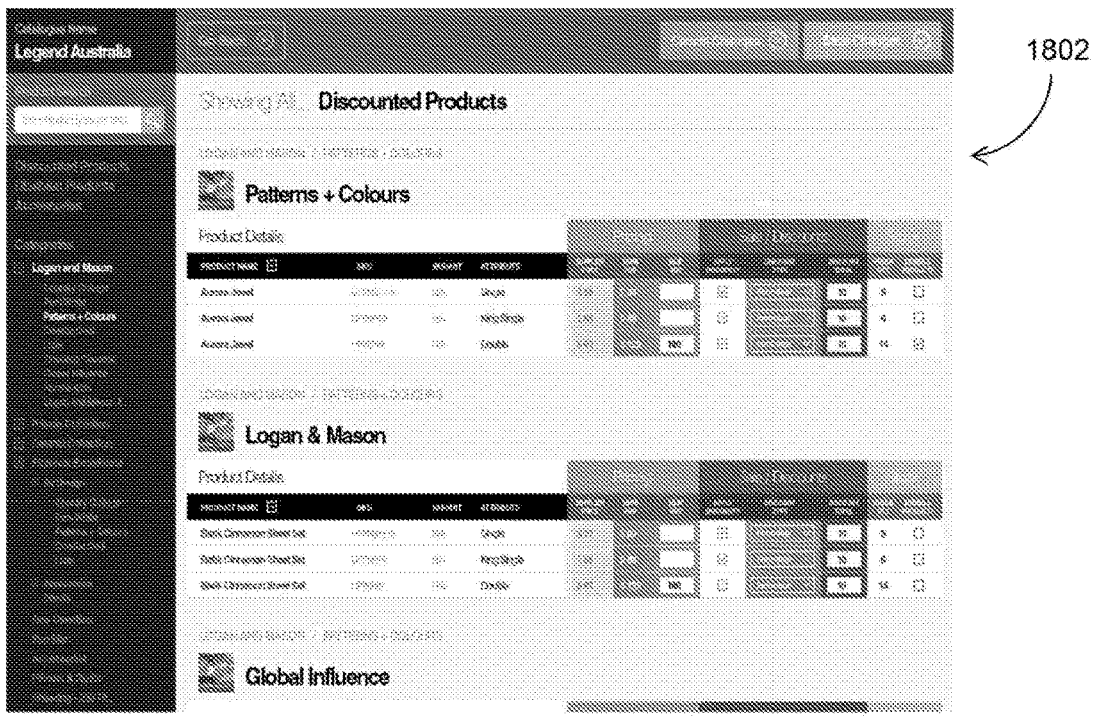
Figure 19:
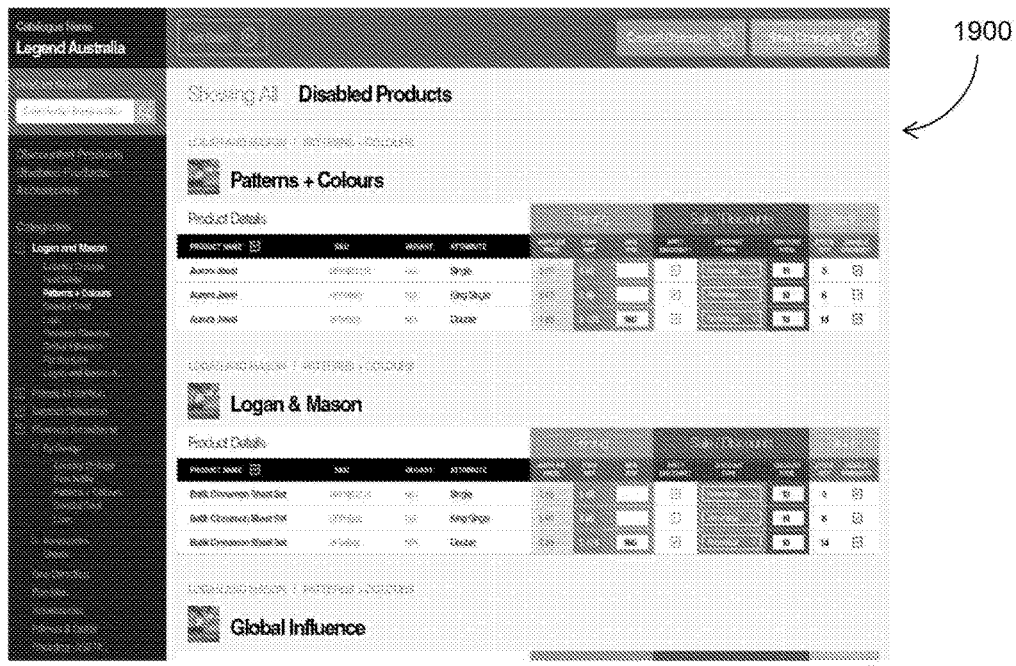
Figure 20:
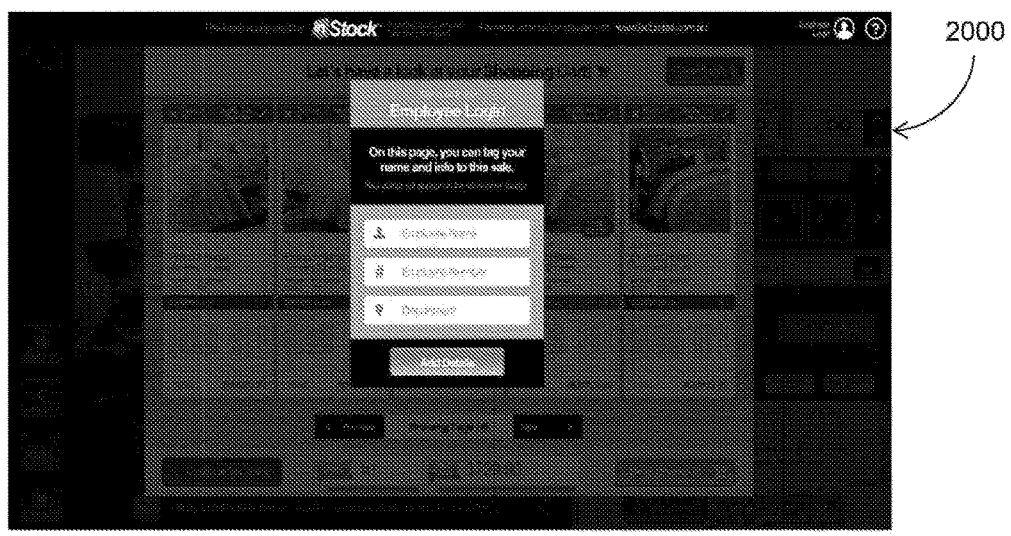
Figure 21:
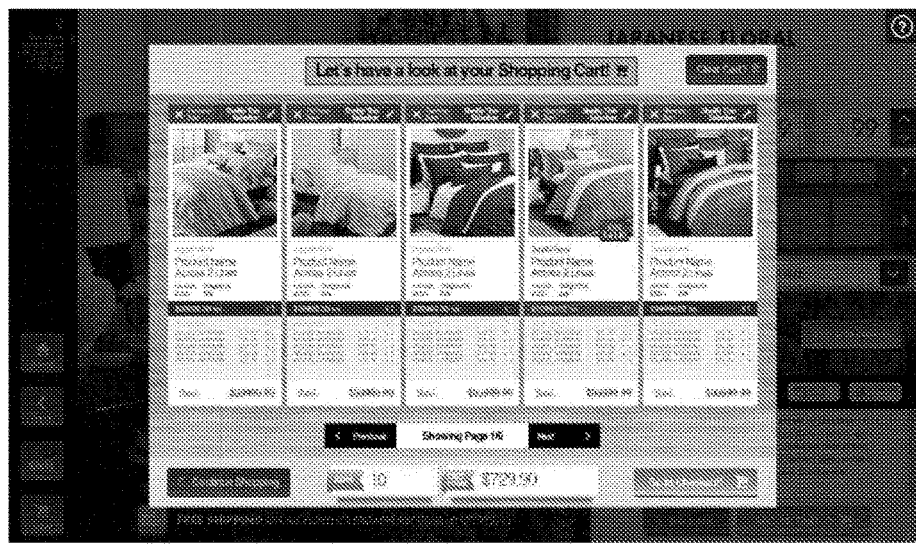
Figure 22:
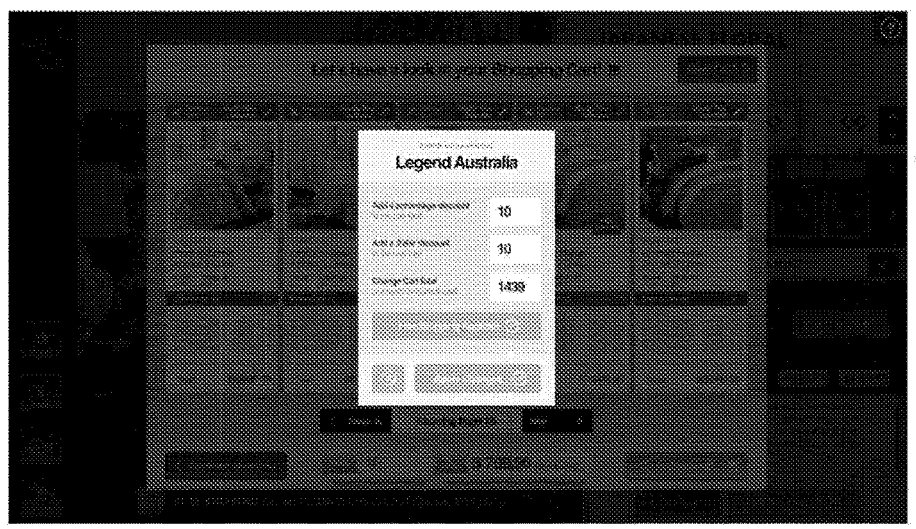
Figure 23:
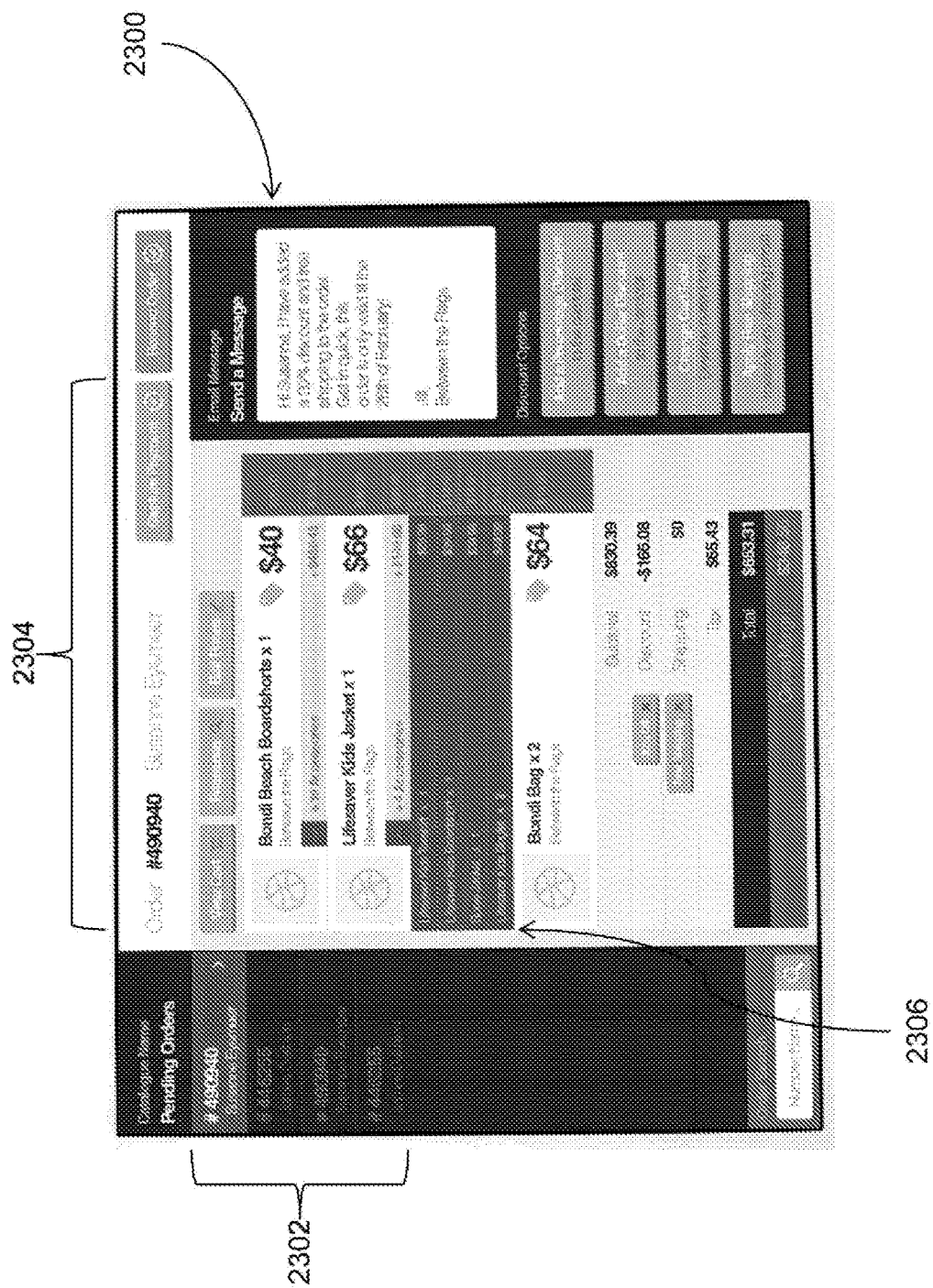
Figure 24:
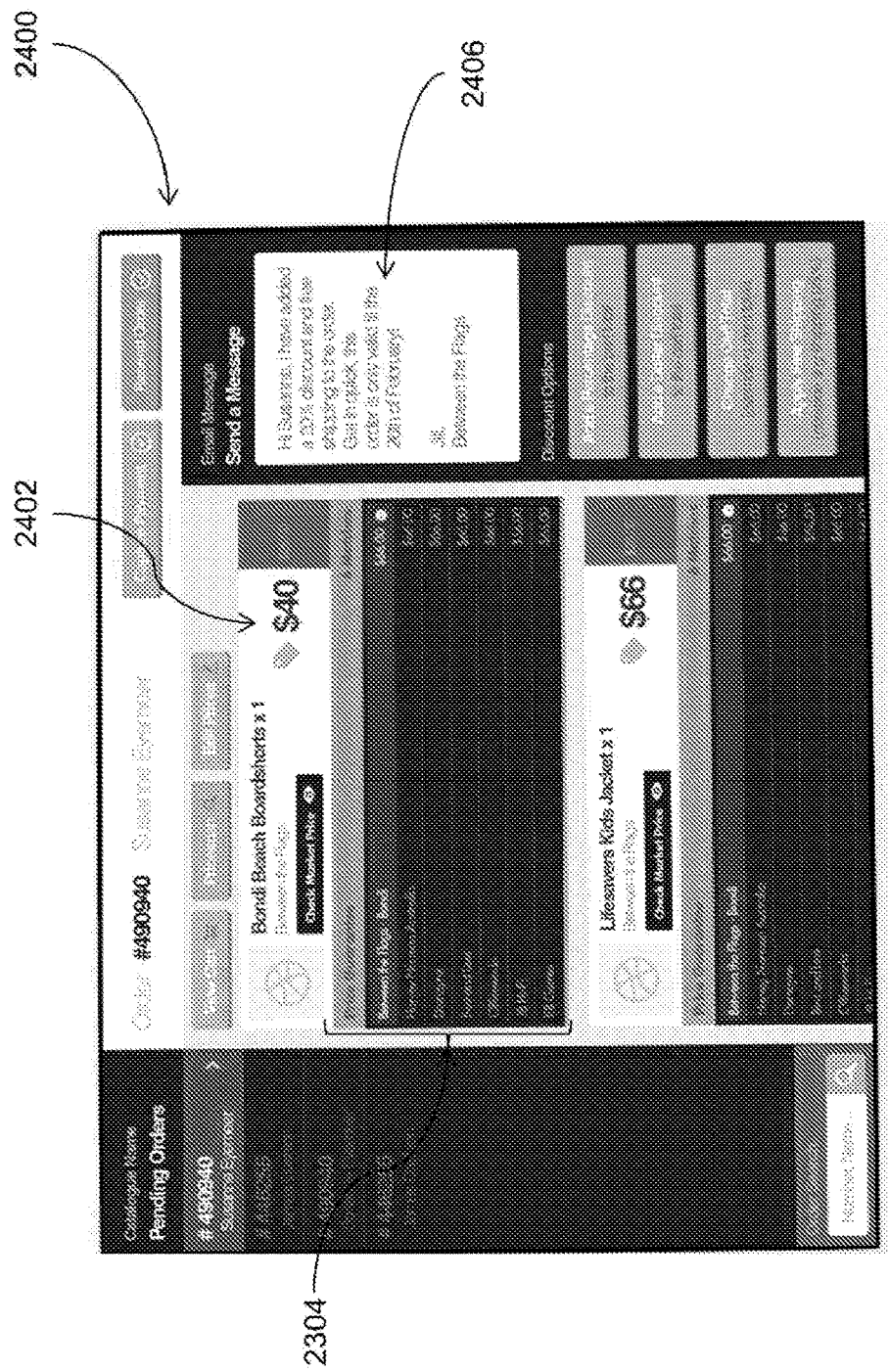
Figure 25:
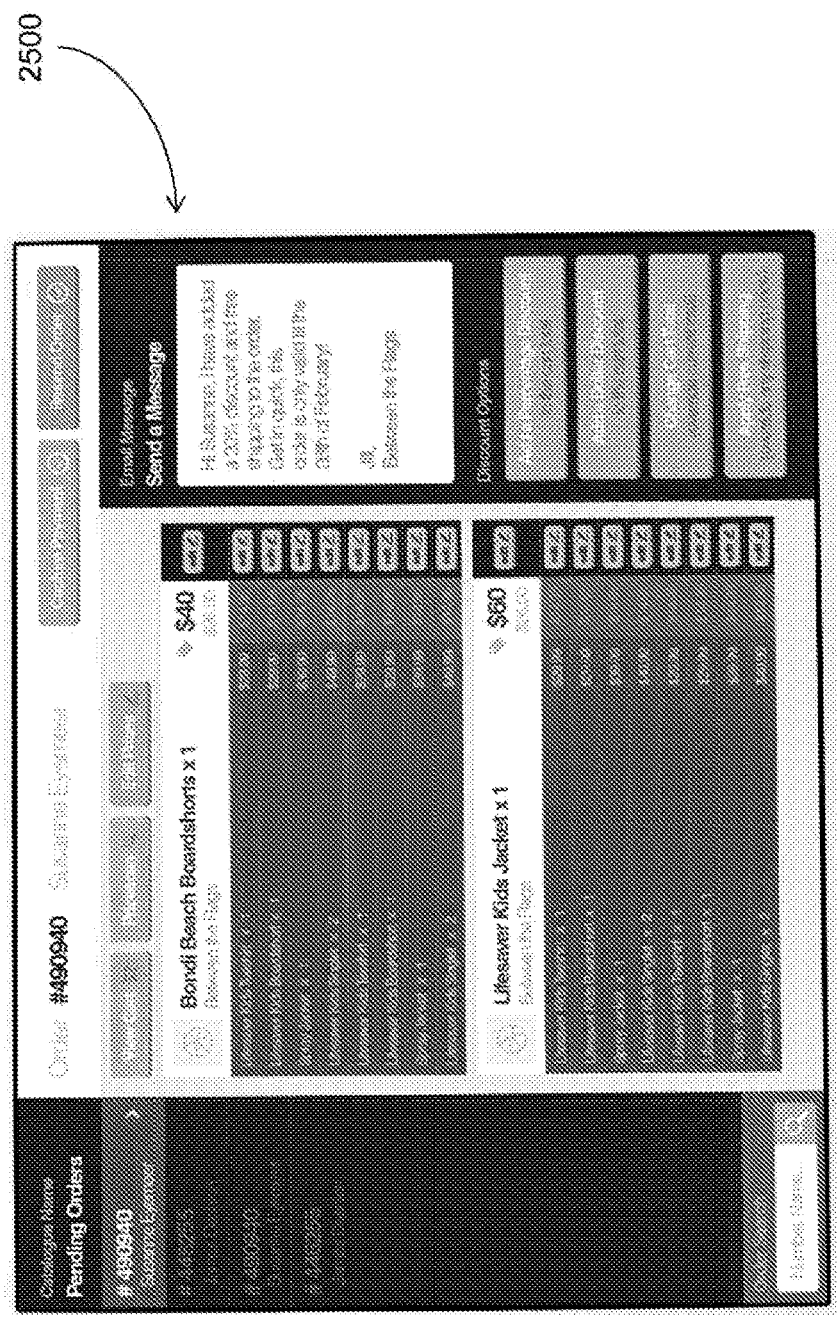

The functions for the touch-screen interface are shown in FIGS. 4 to 16, where:

FIG. 4 shows an example of a "Navigation" frame that appears on a Home screen, for use by a customer;

FIG. 5 shows an example of a "Home screen",

FIGS. 6A and 6B show an example of a "Product Listing" screen, before and after details are populated on it for the products being displayed;

FIGS. 7A and 7B show an example of two different "Product" screens;

FIGS. 8A and 8B show an example of two different "Help" type screens;

FIG. 9 shows an example of an "Accessory" selection screen;

FIGS. 10A and 10B show two views of an example of the "Shopping Cart" pop-up screen;

FIGS. 11A and 11B show an example of a "Checkout" screen, 11B showing the associated online keyboard that is made available for entering text;

FIG. 12 shows an example of a "Delivery" details screen;

FIG. 13 shows an example of a "Shipping" details screen;

FIG. 14 shows an example of a "Payment" details screen;

FIG. 15 shows an example of a "Payment Processing" screen;

FIG. 16 shows an example of a "Payment Complete" confirmation screen;

FIG. 17 shows an example a group of core products screen;

FIG. 17A shows an example of a "Confirmation Category Discount" screen;

FIGS. 18 and 18A show similar screens for accessories and for other discounted products respectively;

FIG. 19 there is shown a screen which allows a user a list of "Disabled Products";

FIG. 20 there is shown an example of a login screen, so that an employee of the retail store may log into the system;

FIG. 21 there is shown a screen where the employee can review the items that have been selected by the customer;

FIG. 22 there is shown a screen where the employee may then add a discount or modify the price of the items to create a new final price;

FIG. 23 there is shown a screenshot of an interface for a "SmartBasket"™;

FIG. 24 there is shown a repetitive office screen;

FIG. 25 there is shown a supplier competitive performance report; and

Figure 26B:
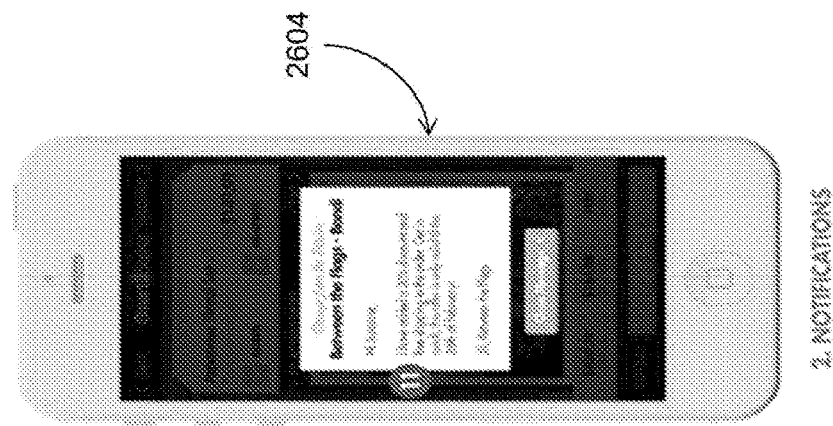
Figure 26A:
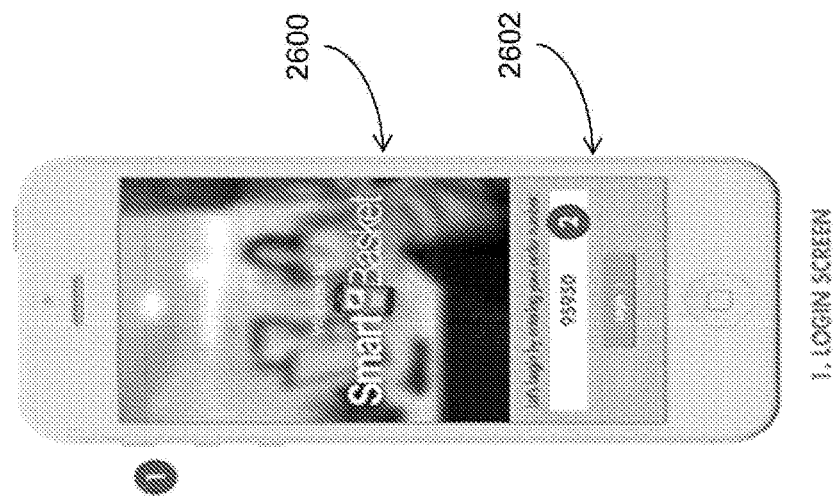
Figure 26D:
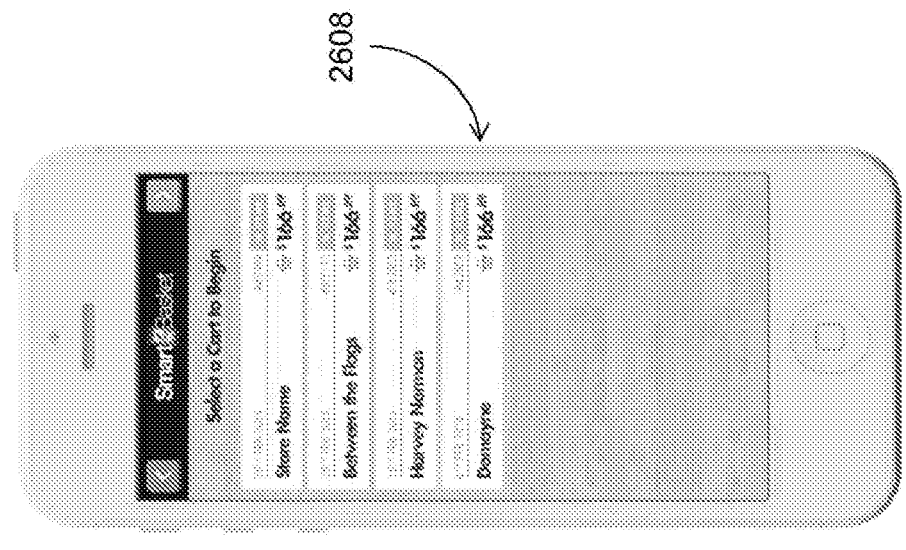
Figure 26C:
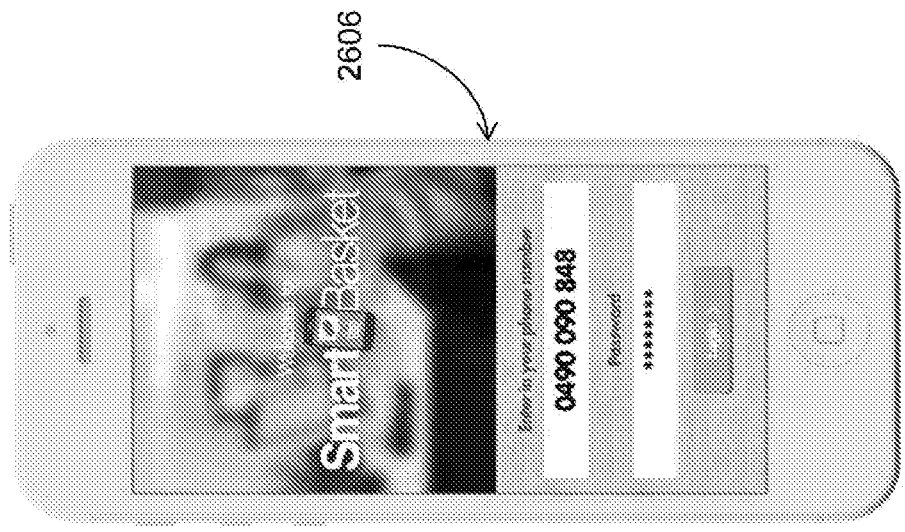
Figure 26F:
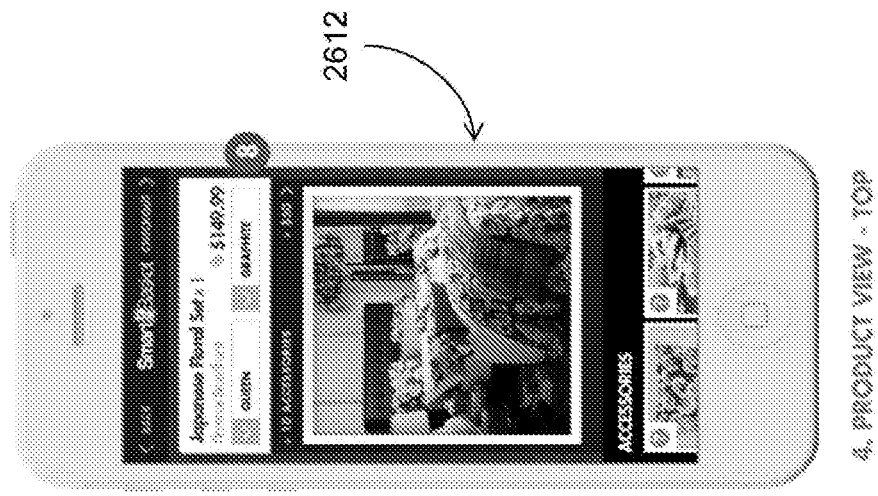
Figure 26E:
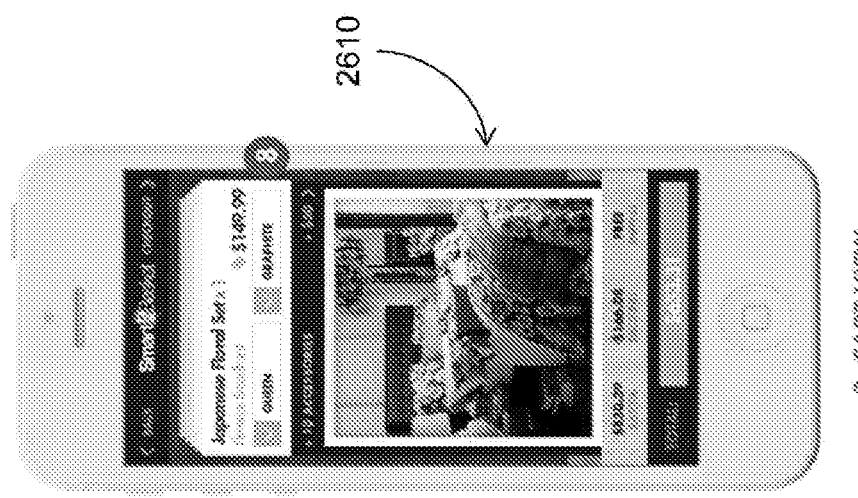
Figure 26H:
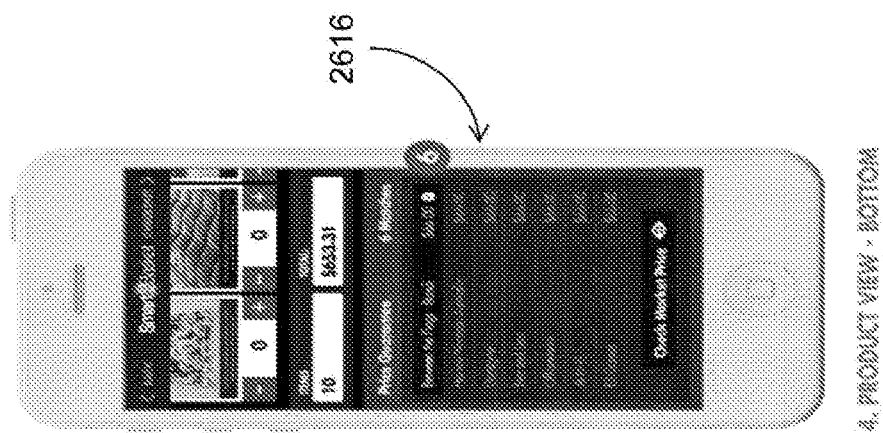
Figure 26G:
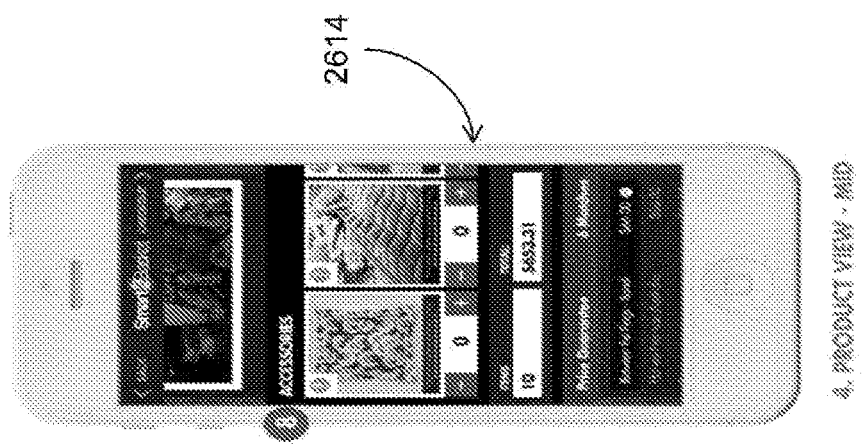
Figure 26N:
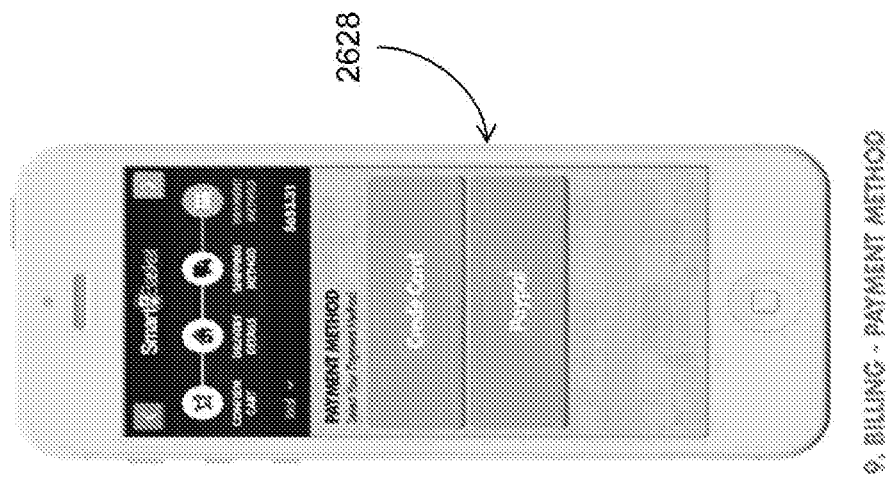
Figure 26M:
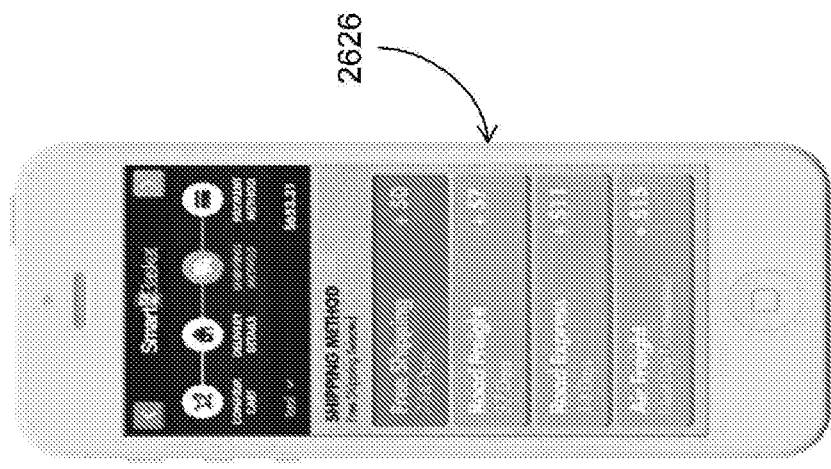
Figure 26P:
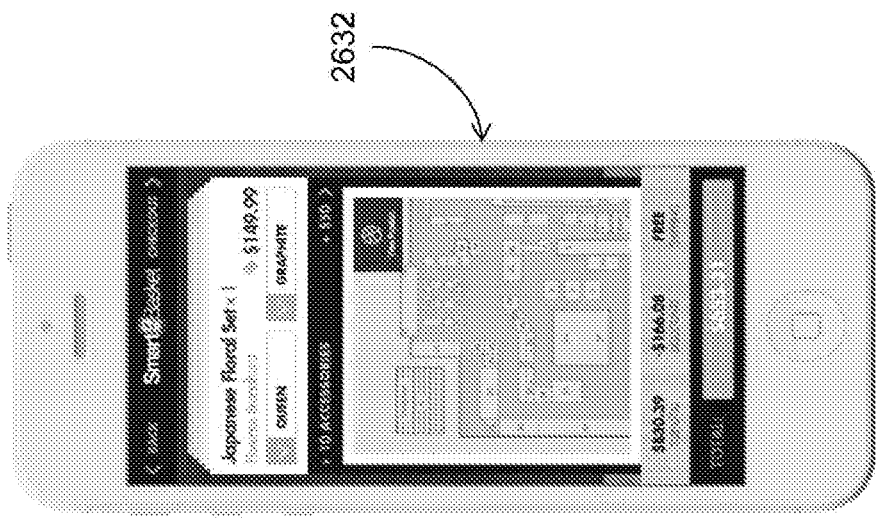

FIGS. 26A to 26P shows a user (i.e. customer) interface for use on a smartphone.

DETAILED DESCRIPTION OF PREFERRED EMBODIMENTS

In the ensuing description, reference will be made to "users", "customers", "salespeople" and "retailer". It will be understood that the aforementioned terms are used to provide the reader with colloquial labels that aim to provide a clear and understandable example of the embodiment. It will be understood, however, that the reader is not to draw any "gloss" from the aforementioned terms, and that the terms are provided solely for illustrative purposes and should not be used to limit or otherwise vary the scope of the embodiments and or the broader invention described and defined herein.

Broadly speaking the embodiment described herein provides a retailing system for providing interaction between a customer and a retailer to assist in the completion of a sale. The system includes a customer interface arranged to display to a customer information about at least one item and an input module arranged to receive input regarding a potential sale of the at least one item from the customer for provision to a database via a communications system. The database is arranged to provide the input from the customer to at least one other user associated with the retailer on a retailer interface viewable by the at least one other user, wherein the at least one other user utilises the interface to review the input and interact with the customer to assist in the completion of the sale.

The customer interface may be an interactive kiosk and/or a remote device under the control of the customer and the interaction of the at least one other user with the customer may include manipulating the sale price of an item as viewed by the customer.

The interaction of the at least one other user with the customer may include communicating at least one incentive to the customer in order to induce the customer to complete the sale.

The system may include a processing module arranged to receive the input from the customer and processes the input to provide analysis information derived from the customer input, wherein the analysis information is presented on the retailer interface.

The processing module may further access the database to retrieve sale information relevant to the at least one item, wherein the processing module processes the sale information to provide further analysis information, wherein the further analysis information is presented on the retailer interface. The further analysis information may include a gross margin associated with the at least one item selected by the customer.

In one specific embodiment, which is described in more detail hereinbelow, there is provided a retailing system for increasing the total sales for a retail premises selling a multiplicity of products, by providing to a customer within the retail premises, a system comprising at least one interactive kiosk in close association with a display of samples of at least some of said multiplicity of products, said kiosk being in communication with a database maintained on a computer system, the database containing information about said products.

The interactive kiosk has at least one display means adapted to display to a customer some information about at least some of said products, means for accepting input from said customer, so as to permit the customer to manipulate the display to allow the customer to view the information from (a) for at least one of the products, means for the customer to choose one or more products that the customer wishes to purchase, by the allowing customer to provide some input for (b), means for accepting payment for the products from customers, means for entering identification details of said customer, means for accepting delivery details for the delivery of the purchased products, and means for connecting the kiosk with the database via a communications system (such as the internet).

The database has means to record the details purchases made by the customer, at least some of these details being input by the customer via the kiosk, means to communicate with a supplier of the goods or services so purchased, and to place an order to supply them, means to record the financial details of the purchase, and means to disburse the amounts payable to the supplier for supplying the goods or services once they are supplied to the customer, and means to disburse the amounts payable to the retailer for retailing the goods or services once they are supplied to the customer; and wherein said samples of the products relate to at least some of the same products available for display and purchase using the kiosk, this display being readily accessible to the customers using the kiosk.

Figure 1A:
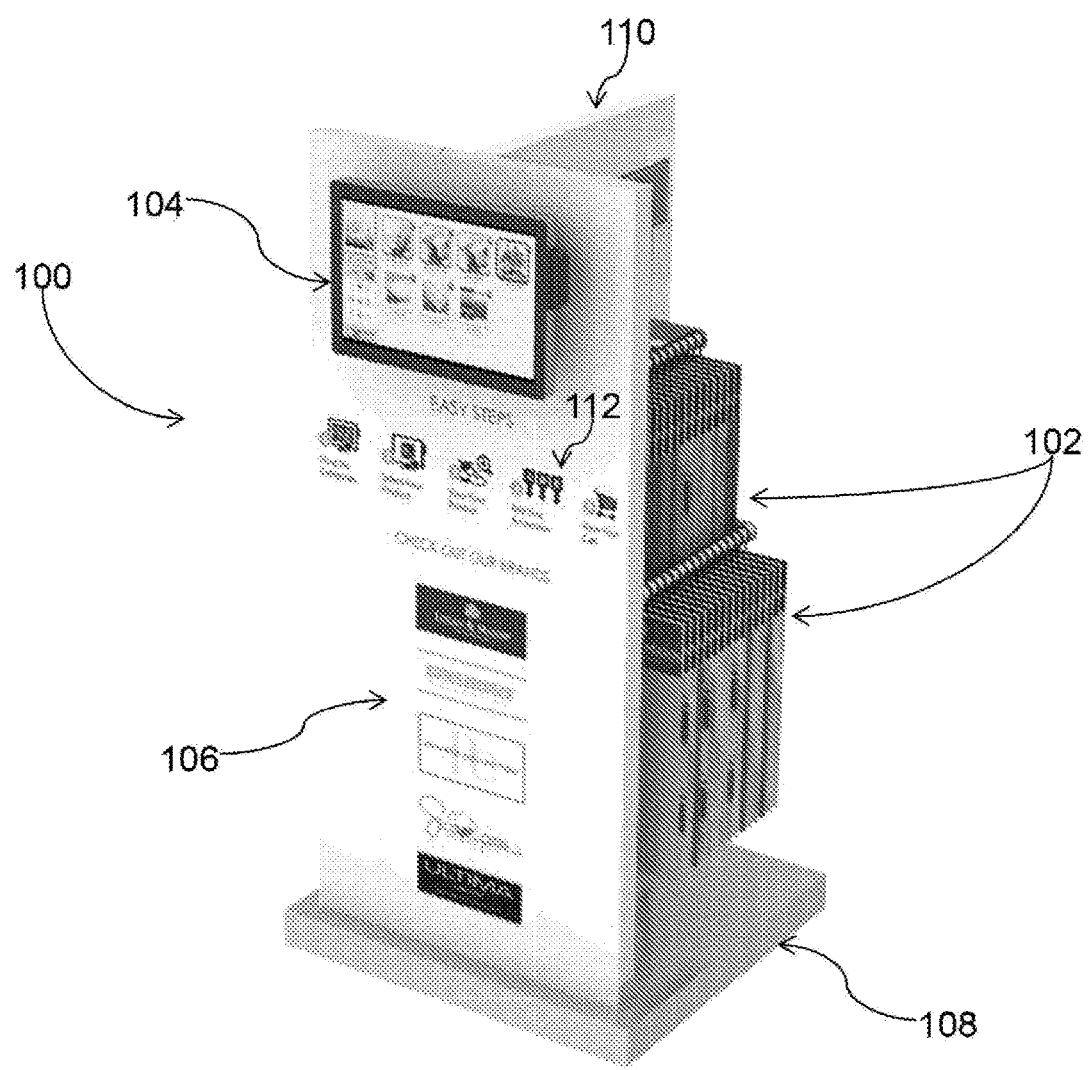
FIG. 1A shows a front view of the kiosk.
Figure 1B:
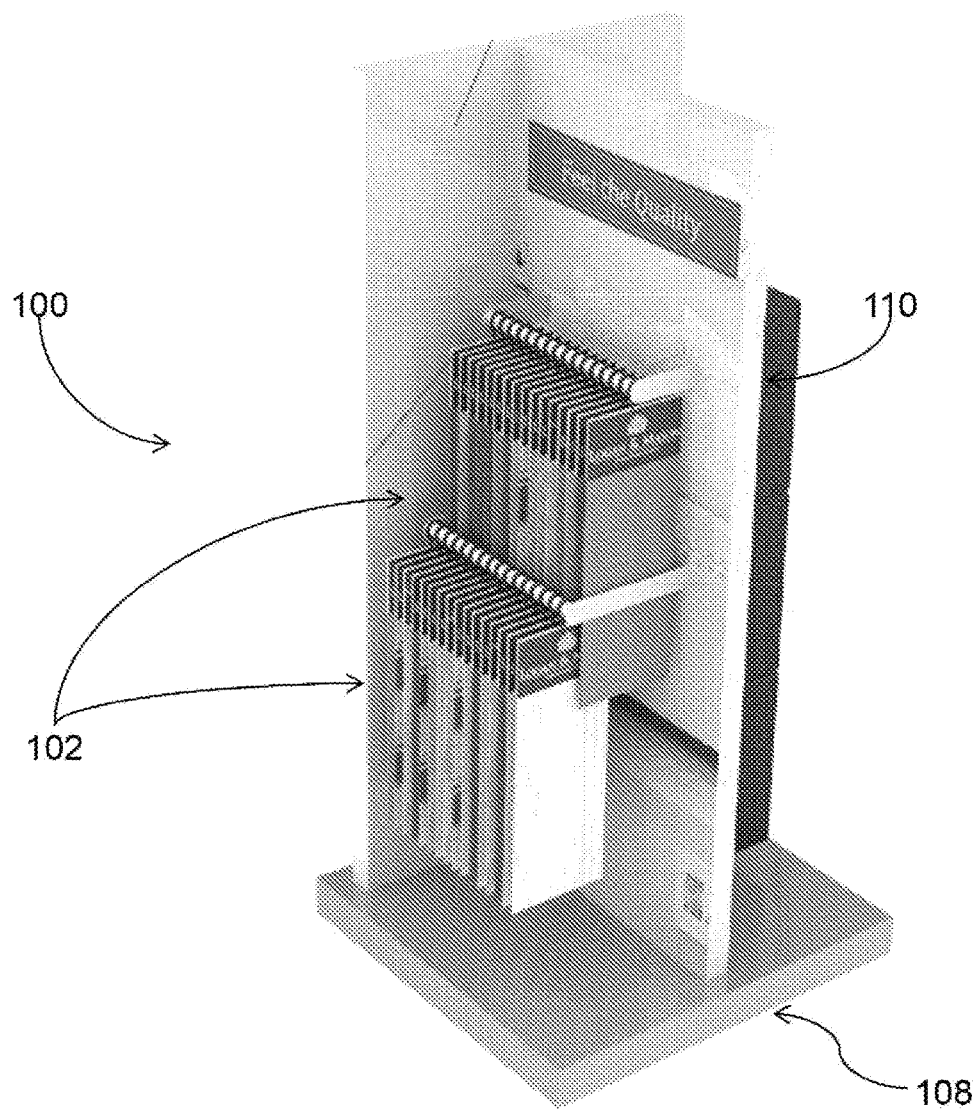
FIG. 1B shows a side view.
Figure 1C:
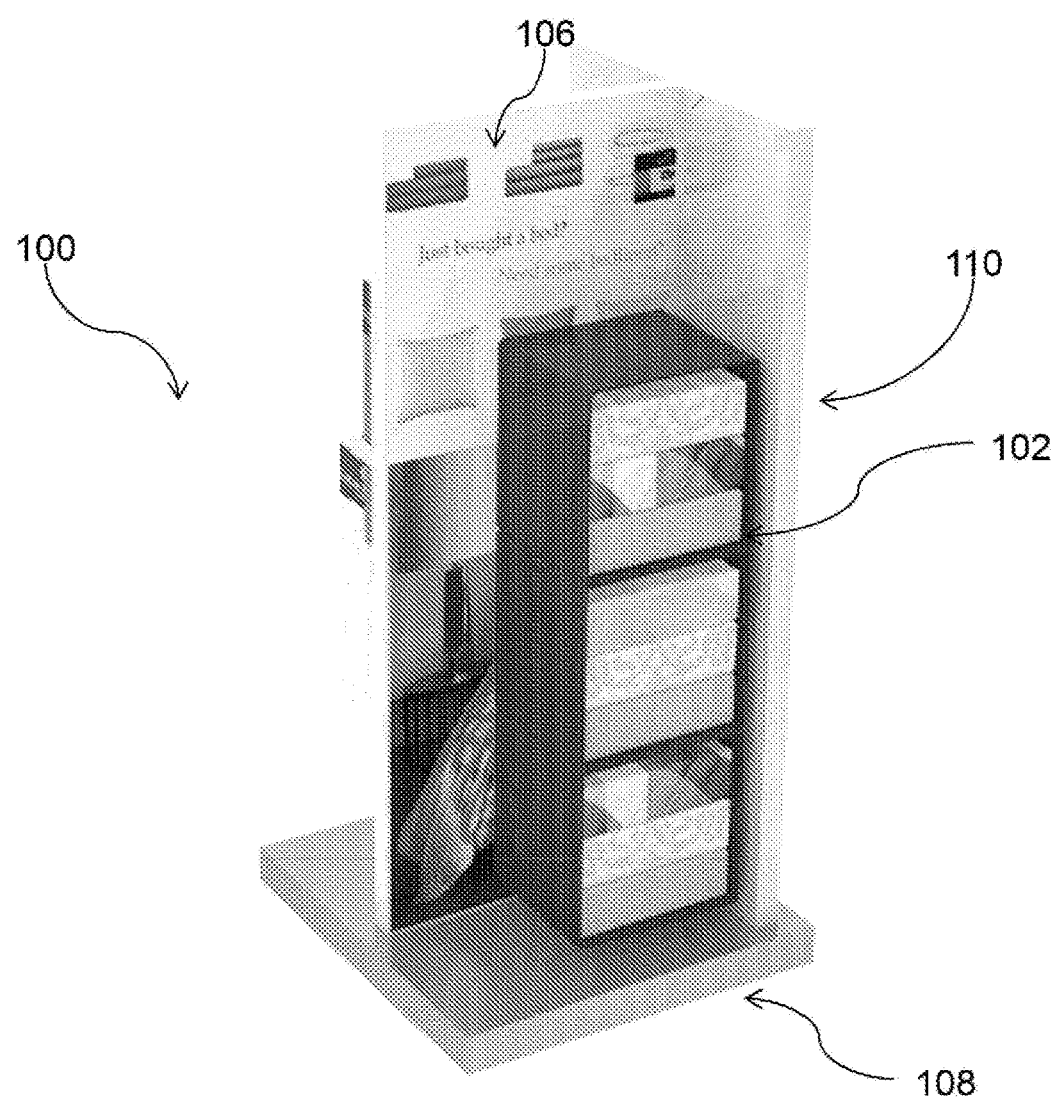
FIG. 1C shows the other side view.

The embodiment will now be described in more detail with reference to the drawings. Various examples of the physical embodiment of the kiosk are provided in FIGS. 1A, 1B and 1C, 2 and 3. FIGS. 1A, 1B and 1C shows three views of an example of a kiosk according to the invention.

The kiosk (100), displays a number of samples (102) of goods, in this example which are bed linen. A touch-screen (104) is mounted on one of the walls of the module in a location that makes it readily and easily available to customers. Some branding and advertising (106) for the products on display are also preferably provided on the kiosk. This branding may be physical and removably fixed, or may also, or instead, be provided on electronic displays. The displays should preferably be able to be updated regularly and easily. The module making up the kiosk generally has a base portion (108) and one or more vertical walls (110).

Instructions (112) for using the kiosk may also be provided, normally near to the touchscreen. Preferably the walls are located to support the displays and shelves for the goods, and also for mounting the touch-screen.

Preferably the walls may have internal cavities for hiding the cables and suchlike that connect the touchscreen display and data input means to the communications system like the internet. Different styles and types of physical displays and fitting for the samples of products being displayed may be provided, such as shelves, cabinets, hanging racks and the like. The physical space available is an important determinant for the size of the kiosk displays. This permits a wide variety of different kiosks, and modules from which to construct the kiosks, to be chosen. Alternatively, some kiosks may occupy existing wall fixtures that have been modified. Some stores have distinctive fittings, and the kiosks may be designed to blend in, or integrate with, such fittings.

It is also preferred that the samples may be housed in a secure fashion. This reduces pilferage, but importantly also helps to keep the display tidy and attractive, when customers cannot remove the samples or move them around. Keeping the kiosk tidy reduces the need for a sales assistant to continually tidy the display, or replace items that are removed. The sample may be secured by fixing them to non-removable racks, or storing them in cabinets, or attaching one portion of the product to the display kiosk itself. However, the samples should still be available for close inspection by the customer if securing the products is to be utilised.

The kiosk may alternatively have more than one display screens, to display additional views of the products, or movies, or advertising, for example. Using such screens permits a centrally controlled campaign or information display to be provided, which can be quickly and easily upgraded or changed. The kiosk may contain speakers to play music, or relay the sound from videos or advertising about the product. The text on the screen may be automatically spoken aloud by the software, to help customers who have difficulty in seeing, or in reading the language involved. There may be lighting provided as part of the kiosk. The kiosk may have means for securing it firmly in place so it cannot be upset or moved. Alternatively, the kiosk modules may have wheels, preferably lockable, to allow it to be moved around to different locations in the store.

Ideally the display screens used are retail hardened units. The associated cables are securely fitted and locked in place. This ensures they cannot be easily or accidentally removed. Typical dimensions for the kiosk unit can be for example a square base which is 800×800 mm, and a height of 1500 mm, and the divider walls may be around 50 mm thick.

Figure 2A:
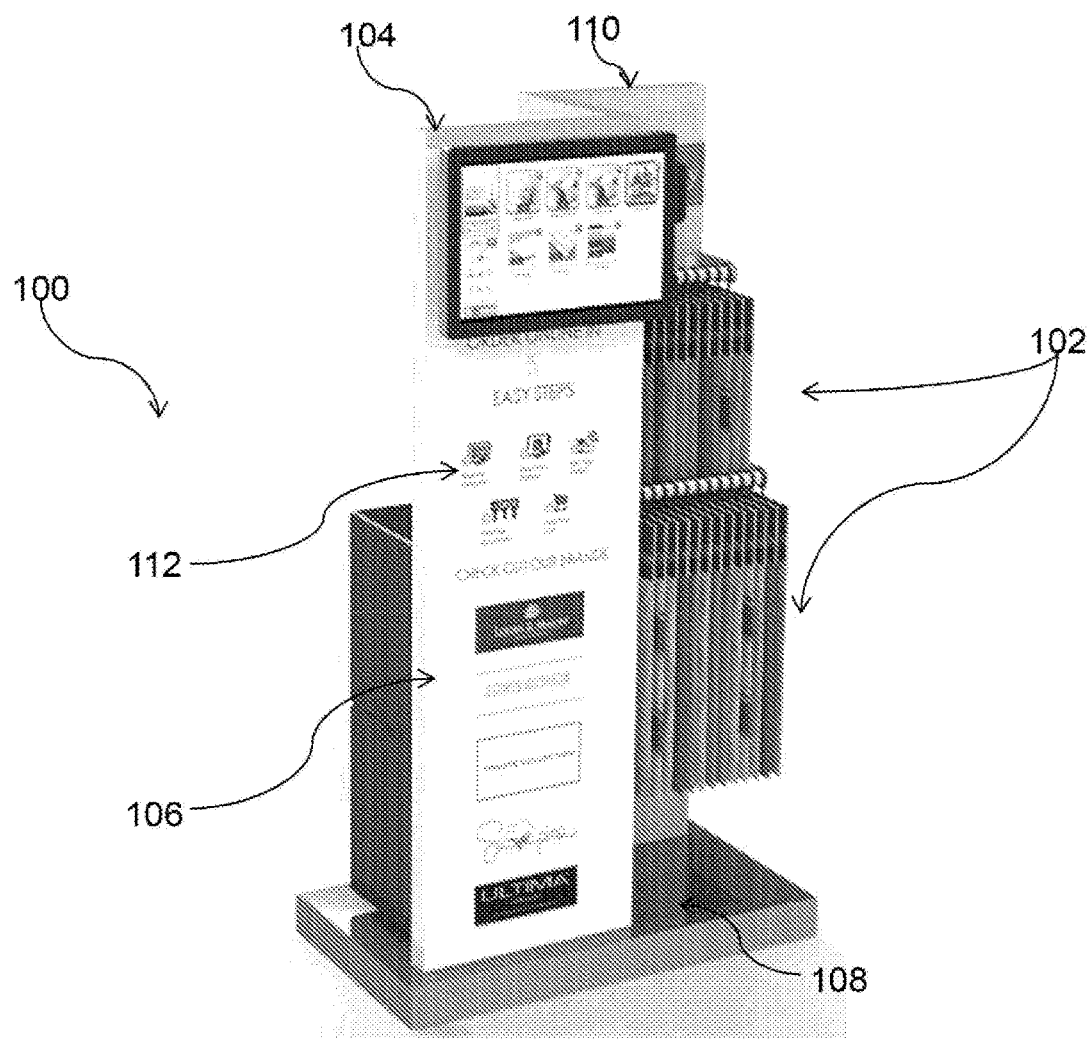
FIG. 2A shows a front view of the kiosk from the left.
Figure 2B:
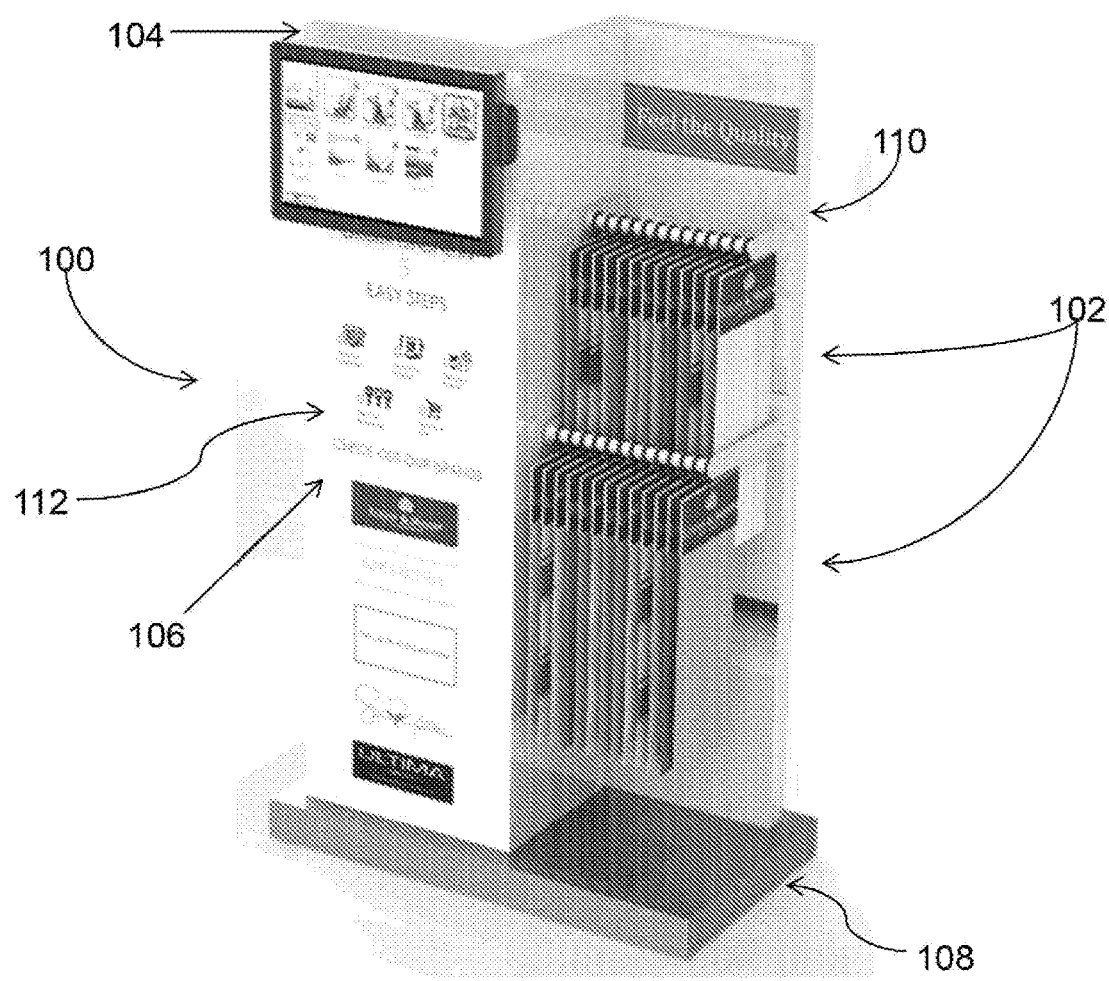
FIG. 2B shows the front view from the right.
Figure 2C:
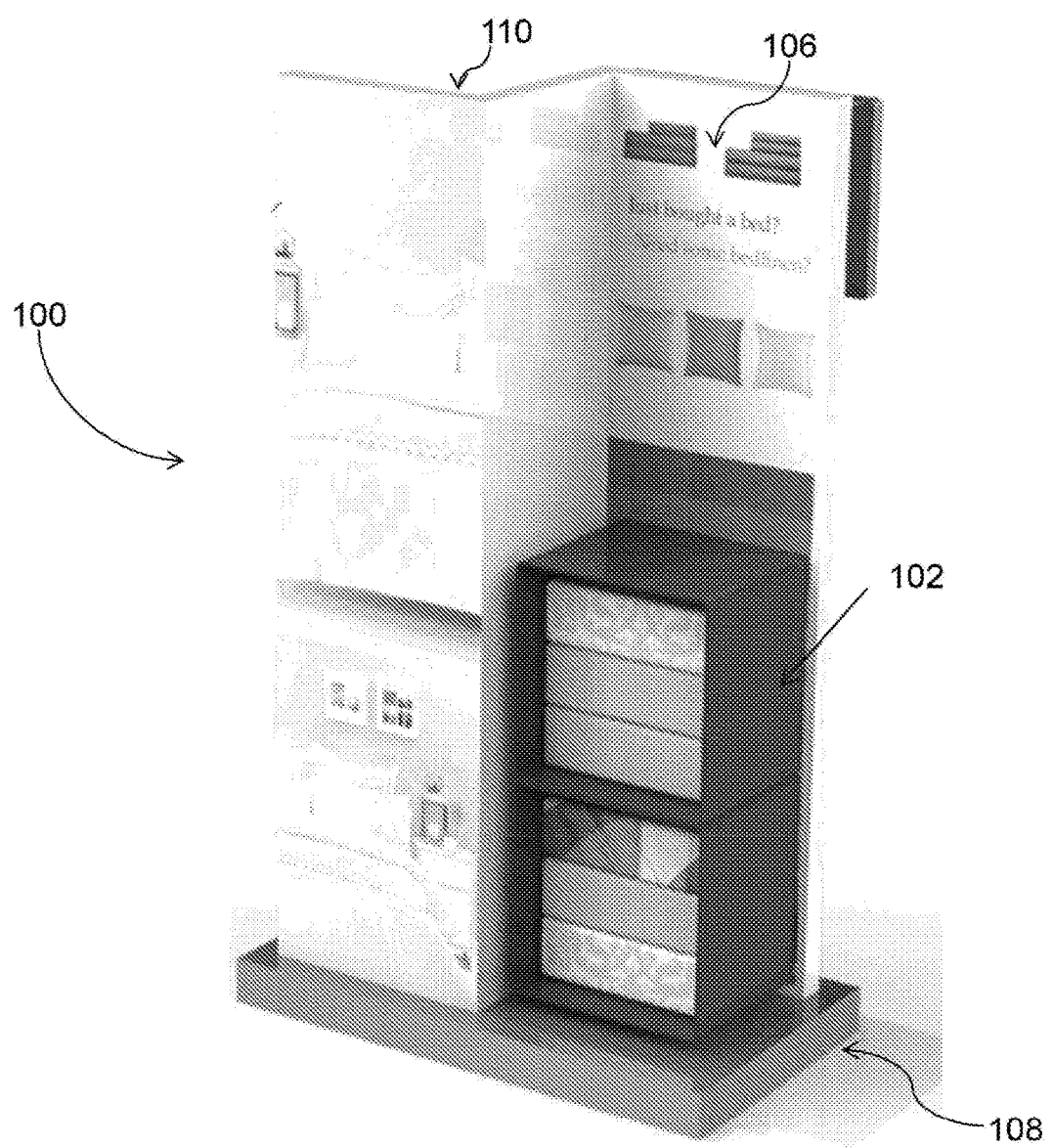
FIG. 2C shows the other side of the kiosk.

In the representations provided in FIGS. 2A, 2B and 2C, another version of the kiosk is shown. Instead of the generally square base and "T" shaped wall arrangement of FIGS. 1A, 1B and 1C, in this example the base is rectangular, and the walls are in a zig-zag arrangement. The features of the kiosk are identified in the same manner as with FIGS. 1A, 1B and 1C.

This arrangement has an advantage in allowing the samples to be easily accessible by a customer operating or watching the touch-screen. This shape may suite specific locations within the store or by mixing different unit shapes; this can improve the aesthetics of the store. Different shaped kiosk units may be used with different brands, to assist in distinguishing them for customers. Typical dimensions for the kiosk unit in FIGS. 2A, 2B and 2C can be for example a rectangular base which is 900×500 mm, and a height of 1500 mm, and the divider walls may be around 50 mm thick.

It may also be advisable to provide the kiosk as a number of modules. These modules may be positioned together or separately, possibly in different parts of the store.

Figure 3A:
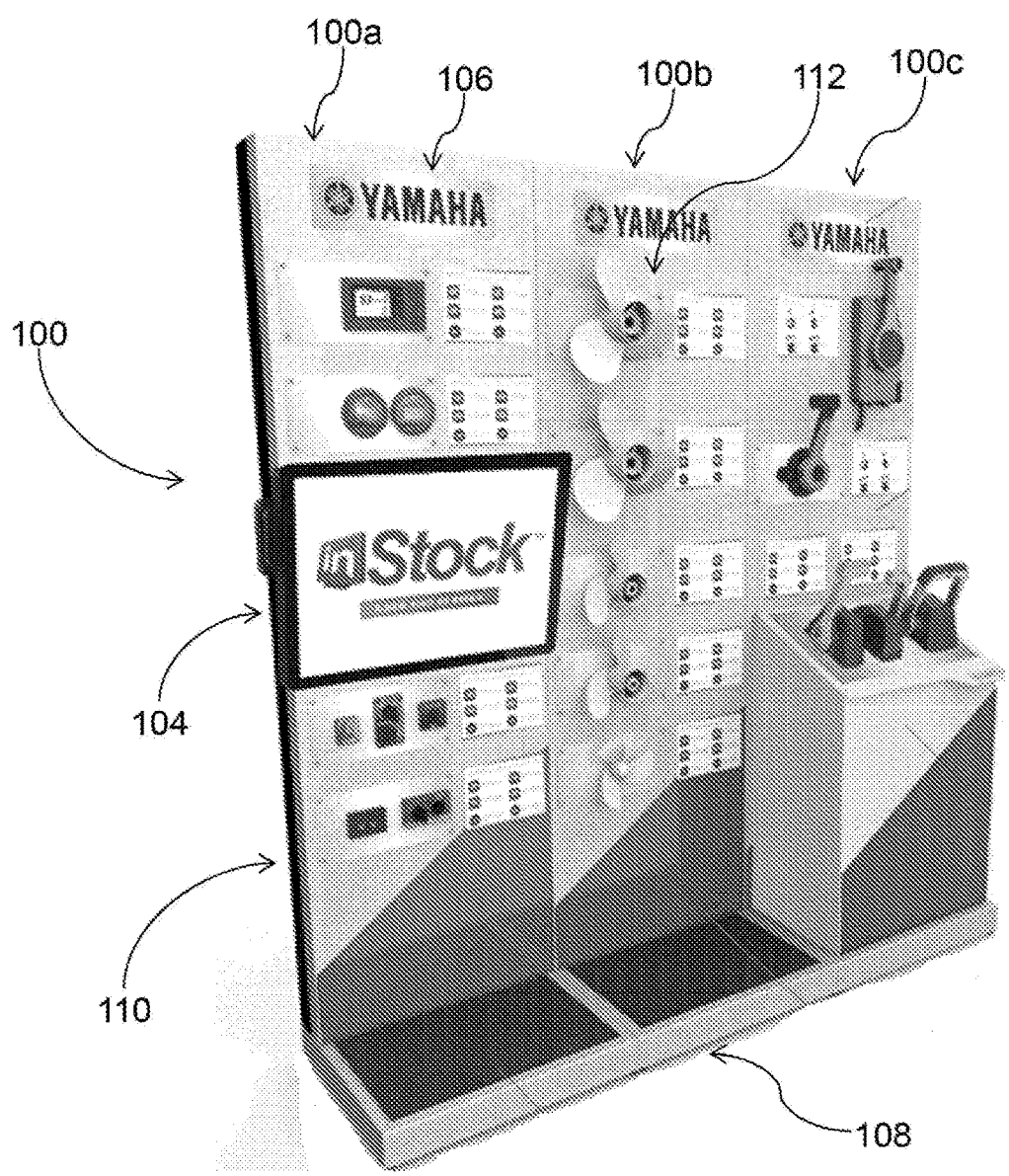
FIG. 3A shows the front of the kiosk and FIG. 3B shows a single module of the kiosk unit of FIG. 3A.
Figure 3B:
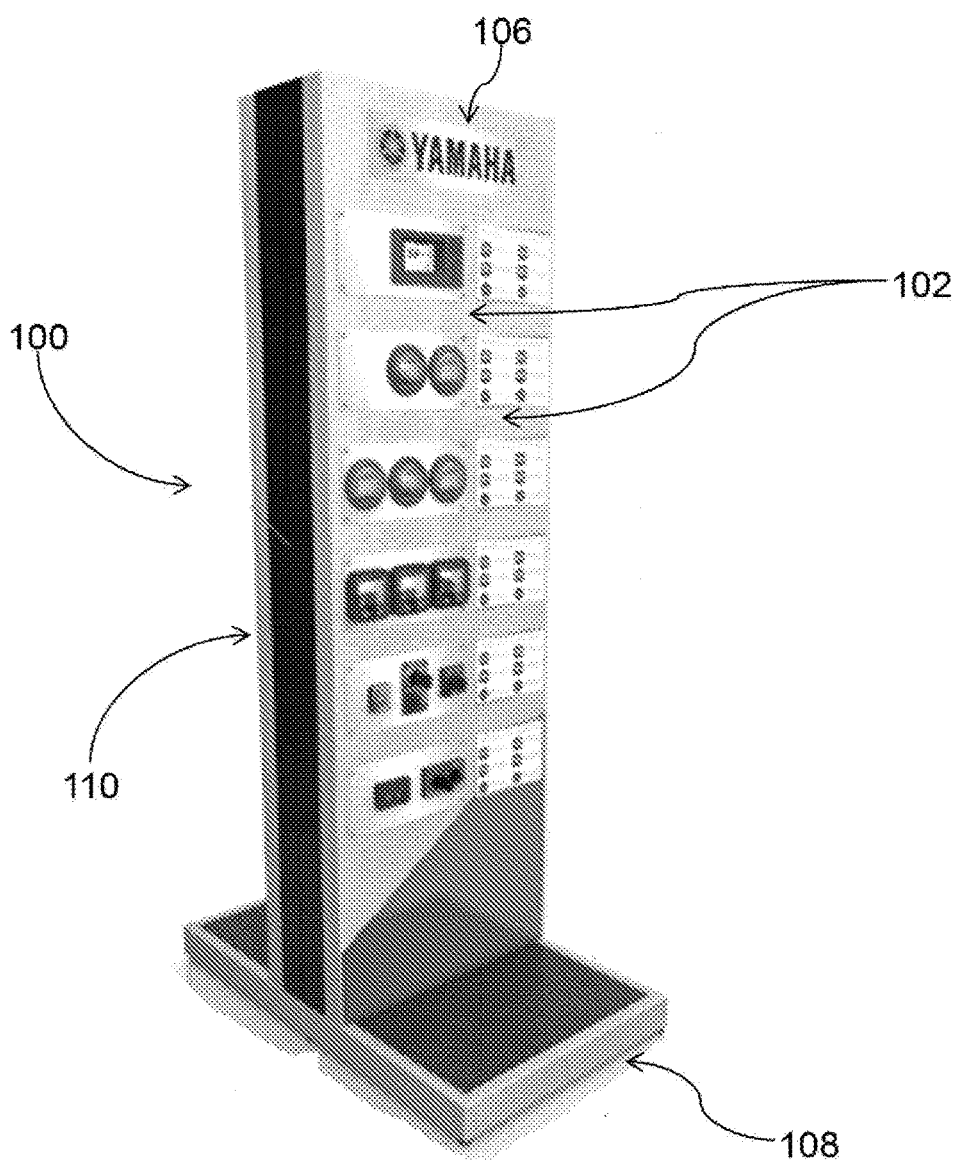

In FIGS. 3A, 3B and 3C, another variation of the kiosk is shown, where the kiosk (100) is made up of three separate modules (100a, 100b and 100c) which are linked and fitted together. The retailer may utilise the different modules in a mix-and-match configuration. For example, when the products, in this example being boating accessories, are updated, a replacement module can be provided having the new models incorporated, which can then be swapped for the older module with the previous models shown. In this example, the samples (102) are fixed into the display kiosk.

As shown in FIG. 3A, the instructions for using the kiosk are including on the display touch-screen 104, rather than being included on the walls of the kiosk. Typical dimensions for the kiosk modular unit can be for example a rectangular base which is 1000×600 mm, and a height of 1900 mm, and the divider panel walls may be around 100 mm thick, and which may allow the panels to be opened, giving access to the interior, where the products are fixed in place. One module shows a box to which samples of boat control levers are attached, allowing the customer to play with them directly.

The functioning of the display touch-screen are now described in more detail. These examples are just one way of implementing the interactivity between the screen and its information display function and its data entry function. Other commonly used alternatives may also be utilised to achieve the desired result.

FIG. 4 at 400 illustrates a portion of a Navigation frame that is provided on a touch screen display. Turning to FIG. 5, there is shown an example of the Navigation Frame that is provided on the touch-screen display including the portion of FIG. 4 at 502 (i.e. the portion 502 is equivalent to the portion 400 of FIG. 4. It is preferably located in a particular location upon the screen. The components displayed are explained in Table 1 below.

TABLE 1

| Legend | Item | Description |
|---|---|---|
| 402, 504 | Rotating Banner | Rotates through images |
| 404, 506 | Home Icon | When selected returns to Home Screen |
| 406, 508 | Video Icon | When selected opens the Video Icon Pop-up and plays video |
| 408, 510 | Language Icon | When selected opens Language Pop-up - (optional) |
| 410, 512 | Email Icon | When selected opens Email Pop-up - (optional) |
| 412, 514 | Categories Sub-Navigation menu | Displays all Categories available on the kiosk. Is used an additional menu option for users to change top level categories |
| 414, 516 | Shopping Cart | Displays total number of items and total price of cart content. When selected opens Shopping Cart pop-up |

This navigation frame permits the user to bring up different displays, and the Rotating Banner (402, 504) shows a series of images of the products available. There is a "Home" icon button (404, 506) which can be selected by a user to return the screen to the initial setting. The selection with a touch-screen will merely involve the customer tapping on the icon. Otherwise, a joy-stick, separate touch panel, mouse or the like can be used to select the button, for instance. Another icon or button will display a video (406, 508) in display area (402, 504) containing information about the products. As a preferred but optional feature, there may be a "Language" button (408, 510) which changes the text being displayed into other languages, although without this option, the text is displayed in the local language, in this example in the English language.

Another option is an "Email" button (410, 512) which allows the customer to receive or send information from or to an email account, where the email address can be entered using the touch screen keyboard. In a preferred approach, this button permits the customer to join a mailing list. Alternatively, other links to Twitter, Facebook or the like may be provided instead, or a selection permitted among them, to perform a similar purpose. In the "Categories" area (412, 514) buttons may be provided to permit the customer to filter the products being displayed to specific sub-categories, to aid in locating particular items. Also, the display ideally provides access to the "shopping cart" which is a known concept utilised with online retailing software systems (414, 516).

In FIG. 5, an example of the home screen is shown. The components of the home screen are explained in more detail in Table 2 below.

TABLE 2

| Legend | Item | Description |
| --- | --- | --- |
| 518 | Category Image | When selected goes to either the Product listing page or next grouping level page |
| 520 | Category Product Indicator | Displays the total number of Products available in the Category |
| 522 | Category Name | Display Category Name |
| 524 | Category Description | Display Category Description |

This portion of the screen shows icons for each category of products (518). When an icon is selected the display changes to show either the product listing for that category, or a sub-category listing. Ideally the number of possible products (520) that are available for each category is indicated adjacent each category icon. Under the icon the name (522) and description (524) of the category may be displayed.

In FIGS. 6A and 6B, examples of a "product listing" screen 600 is shown. The components of screen 600 are explained in Table 3 below. This screen shows a listing of all the products available to be purchased in the selected category.

TABLE 3

| Legend | Item | Description |
| --- | --- | --- |
| 602 | Product Image | When selected goes to Product screen |
| 604 | Product Name | Name of Product |
| 606 | Non-sale Product Price | Price and display of Product not on sale |
| 608 | Sale Product Price | Price and display of Product on sale |
| 610 | Product Overlay | Conveys to the user any additional Product information |

An image of each product is shown (602), as well as its name (604), and a price (606) for each product. The normal price is shown, but preferably any adjusted prices for products on sale (608) may be indicated in a special way, such as using distinctive colours, and ideally showing the original price (606) as well, but with the amount shown with 'strike through'. An "overlay" symbol icon may also be displayed (610) to indicate any additional information about the product of special significance.

In FIGS. 7A and 7B, examples of a "product" screen 700 is shown. The components are explained in Table 4 below. This screen shows the details of each of the products available to be purchased that have been selected by a customer. It would normally be the last screen shown to the user prior to the checkout process. Its general purpose is to provide the user with everything they may want to know about a specific product. Options such as about size, colour, style, model, and the like are shown here.

TABLE 4

| Legend | Item | Description |
| --- | --- | --- |
| 702 | Product Image | Large Product default image |
| 704 | Product Name | Name of Product |
| 706 | Brand Name | Name of product Brand |
| 708 | Price | Price based on quantity (Preferably the wholesale price is also available, so the wholesale cost per order can also be calculated and stored) |
| 710 | Quantity | Number of Products selected to be added to cart |
| 712 | Add/Remove Quantity | When + selected adds 1 to quantity, when − selected 1 subtracted from quantity |
| 714 | Colour Selector | Display colours available for Product. When selected: Change highlighted colour. Loads product attributes applicable for that colour i.e. Product images, attributes. |
| 716 | Image Selector | Display attribute list available for Product. When selected: Change highlighted image Changes main image area |
| 718 | Size Selector | Display attribute list available for Product. When selected: Save information for user Product selection |
| 720 | Add Accessory Button | When selected opens Accessory pop-up |
| 722 | Product Description | Displays description of Product |
| 724 | Sizing Help Button | When selected opens Size Information Pop-up |
| 726 | Contact Us Button | When selected opens Email Pop-up |
| 728 | Back Button | When selected goes back to the previous screen the kiosk was on |
| 730 | Add To Cart Button | When selected adds Product to Shopping Cart |
| 732 | Product Overlay | Conveys to the user any additional Product information |

In the product screen, a representative product image (702) is displayed, along with its name (704) and brand (706). The retail price (708) is shown. A field to display the quantity for the product (710) is displayed along with controls (712) to increase or decrease the quantity displayed. The quantity can default to 1, for example. Controls for selecting the colour (714), if appropriate for the product, can be displayed. All these controls may be used to display other variants. If there is a series of images available, then thumbnails can be provided (716) letting the customer swap to other views of the product for the main image (702). Controls for selecting the size (718), if appropriate for the product can be displayed, or this may be used for other attributes. Preferably if the product can be sold with accessories, then a control for selecting these (720) can be provided, which can cause a pop-up window to appear, to allow this accessory to be selected. A product description is displayed (722).

Various functions to assist the customer may also be provided. These may include a "Sizing help button" (724), or a "Contact us" button (728), for example. A "Back" control (728) is provided. An "Add to the shopping cart" control (730) is also provided. Also a product overlay control (732) may be provided to give the customer access to additional product information.

In FIGS. 8A and 8B, examples of pop-up "Help" screens 800 are shown. The components are explained in Table 5 below. Such screens "pop-up" or appear on top of the original screen from where this help screen is called, by means of clicking or tapping on a button on the original screen. FIG. 8A is an example of a "Contact Us" screen, where an image (A) of the company, (usually including a logo, or some advertising), which is the source of the goods that the kiosk relates to, is shown. The details for the company is also provided (B) usually showing its address and telephone details, and optionally this may also include a link to further allow a connection to the company's web site, or an email link, that may permit the customer the option of sending the company an email, for example. Otherwise the customer may copy these details onto their own smart-phones allowing them to call, text or email the company themselves. A control (C) is available to permit the user to close the pop-up window, and return to the original screen.

TABLE 5

| Legend | Item | Description |
| --- | --- | --- |
| 802 | "Contact Us" (or "Sizing") Image | Contact us information for users to read |
| 804 | "Contact Us" (or "Sizing") Description | Information about contact us |
| 806 | Close Button | When selected the pop-up closes |

In FIG. 8B, an example of a similar pop-up window is shown, which provides a customer with help on sizing, for bed linen or clothing items, for instance. Again, there is an image (802) or table, or text explanation, giving the customers conversion sizes in metric, imperial, or other sizing systems, or perhaps for sheets, then the King, Queen, Double, and Single sizes and their actual measurements. A similar template may be used for all the Help pop-up windows, to assist with the design of the system. Again a portion of the window is set aside for text explanation (804, and a "Close" button or control (806) is provided to allow the user to close the window and return to the previous window.

In FIG. 9, an example of an "Accessory" pop-up window 900 is shown. There is an image for the main product (902), and smaller images or thumbnails (904) of all of the accessories which may be selected to accompany the main product, are also provided. Each type of accessory may ideally be its own product that can be located from the main enquiry, so this function can operate as a short cut to allow customers to find matching accessories to an initial selection for purchase. In this example a "left arrow" 906 and "right arrow" 908 control is provided to allow the user to select the quantity number for each accessory, by adding or decreasing the quantity that is also shown beneath the accessory image. This also updates the subtotal 910. The name of each accessory (916) is provided adjacent to its image. A field showing the subtotal (910) is preferably provided, and a control (912) to permit the user to add an accessory to their shopping cart is also available. There is also provided a close button 914. A summary of these controls is shown in Table 6 below.

TABLE 6

| Legend | Item | Description |
| --- | --- | --- |
| 902 | Main Product Image | Main Product image |
| 904 | Accessory Image | Accessory image |
| 906 | Left Arrow | When selected: Adds one to quantity Increases Sub-total |
| 908 | Right Arrow | When selected: Decreases one from quantity Decreases Sub-total |
| 910 | Sub-Total | Displays sub-total amount of Accessories added to cart |
| 912 | Add Accessory Button | When selected add Accessory selection to users cart |
| 914 | Close Button | When selected closes Accessory pop-up |
| 916 | Accessory Name | Name of Accessory |

FIGS. 10A and 10B show two views of the shopping cart pop-up window 1000. A product image (1002) is shown for each of the items that the customer has decided to purchase. Beneath that image the name of the product (1004) is displayed. The price of the product (1006) is also shown preferably beneath the product name. In this example, at the bottom of the window, a summary of the number of items selected (1008), and the total price (1010) for all the items in the shopping cart is displayed. Various controls for manipulating the shopping cart are also provided. For example, a button that clears all the selected items (1012) can be provided, to allow the user to start over. A "Checkout" button (1014) is provided, to allow the customer to continue with the purchase, for when the shopping cart is ready. A control that allows the customer to remove an item (1016) may also be provided. If there are more selected items than can appear on one screen, then a control is shown that allows the customer to move to following or previous screens, in the form of left arrow (1018) and right arrow (1020) buttons. A "Close" button (1022) will close a pop-up window. For each of the selected items some details are provided. The product name or brand (1024) is shown, along with the selected colour description (1026), and the size description (1028), if appropriate. The quantity selected for each product is also indicated (1030) as is a subtotal (1032) taking the quantity into account. If related accessories have also been ordered, then their details (1034) are shown beneath the main product, and their prices are included in the subtotal (1032). FIG. 10A shows the view initially presented to the customer, while 10B shows the window with its details populated.

TABLE 7

| Legend | Item | Description |
| --- | --- | --- |
| 1002 | Product Image | Product default image |
| 1004 | Product Name | Name of Product |
| 1006 | Product Price | Product price |
| 1008 | Cart Items | Total number of items in the shopping cart |
| 1010 | Cart Price | Total price of all items in the shopping cart |
| 1012 | Clear Cart | When selected opens confirmation alert box |
| 1014 | Checkout Button | When selected opens Billing Step 1 screen |

TABLE 7-continued

| Legend | Item | Description |
|---|---|---|
| 1016 | Remove Item Button | When selected opens confirmation alert box |
| 1018 | Left Arrow Button | Move left through Products in cart |
| 1020 | Right Arrow Button | Move right through Products in cart |
| 1022 | Close Button | When selected closes the Shopping Cart Pop-up |
| 1024 | Product Brand | Brand of Product |
| 1026 | Product Colour Name | Colour name of the Product |
| 1028 | Product Size Name | Size name of the Product |
| 1030 | Product quantity | Number of items for Product added to cart |
| 1032 | Product total | Total amount of Product cost (product price X quantity) |
| 1034 | Accessories | Details of chosen accessories |

Once the customer has approved the purchases, and has used the Check our control then the customer will be asked to provide some identification details. An example of a screen 1100 to enable this functionality is shown in FIGS. 11A and 11B. A summary of the controls and features is provided in Table 8 below. The first step of the checkout process is to collect the customers basic details. These include the customer's name, preferably divided into first name (1102) and surname (1104) with their telephone number (1106) and email address (1108). Some instructions are preferably also provided (1110) for guiding the customer to fill in the needed information. A basic check is carried out that the requested information has been provided, and preferably that the right type of information is entered in each of these fields. For example, the email field must have a properly formatted email address that includes an "@" character for instance. An indicator (1110) is provided to flag that either the information is missing or that it is not the expected right type of information.

In addition, when the user selects a field where text must be entered, an on-screen keyboard (1136) is displayed, as shown in FIG. 11B. The customer can tap, or otherwise select, the keys in order to type in their name and so on. Alternatively a voice recognition system can be used to handle this.

A button (1112) allows the customer to continue shopping, by validating the entered data and then moving back to the "Home screen", perhaps to continue shopping. A button that allows the customer to view the shopping cart (1114) also validates the entered data and then opens the "Shopping cart" pop-up window. A Back (1128) button validates the screen and then returns to the previous page. Finally, a "Next step" button (1130) validates and moves on to the next step in the billing process.

Preferably, a summary of the order is also shown with the product name (1120), product quantity (1122), product attributes (1124) and the product price (1126). The total cost (1132) is indicated.

TABLE 8

| Legend | Item | Description |
|---|---|---|
| 1102 | First Name | User's First Name |
| 1104 | Last Name | User's Last Name |
| 1106 | Phone Number | User's Phone Number |
| 1108 | Email Address | User's Email Address |
| 1110 | Information text | Informs user of what information is expected of field entry |
| 1112 | Error Indicator | Visual indicator of whether field has passed validation |

TABLE 8-continued

| Legend | Item | Description |
|---|---|---|
| 1114 | Continue Shopping Button | When selected: Forces validation of current screen If validation successful goes to Home Screen |
| 1116 | View Cart Button | When selected: Forces validation of current screen If validation successful opens Shopping Cart pop-up |
| 1118 | Contact Details Button | When selected forces validation of current screen |
| 1120 | Product Name | Name of product being purchased |
| 1122 | Product Quantity | Quantity of product being purchased |
| 1124 | Product Attribute | Attributes of product being purchased |
| 1126 | Product Cost | Total cost of product being purchased |
| 1128 | Back Button | When selected: Forces validation of current screen If validation successful goes back to previous page |
| 1130 | Next Step Button | When selected: Forces validation of current screen If validation successful goes next step in billing process |
| 1132 | Total Cost | Total cost of order being purchased including shipping |
| 1134 | Subscription | Enables user subscription |
| 1136 | Keyboard | Windows keyboard for user input |
| 1138 | Delivery Address | When selected forces validation of current screen |
| 1140 | Shipping Method | When selected forces validation of current screen |
| 1142 | Payment | When selected forces validation of current screen |

In FIG. 12, an example of a window 1200 for entering the customer's address details is shown. Again a pop-up keyboard is made available to allow the customer to add their address. Some of the fields, such as the "Country" (1202) field, provide a drop down list, where all possible countries are shown, and the user only needs to select the right one. Some detail about the items of information to be entered is given in Table 9 below.

The customer is requested to provide their country (1202), state (1204), suburb (1206) and street address (1208). As with the screen for entering the customer's name, the screen also validates that the required fields are filled in, and the type of text entered is valid. Error indicators (1212) alert the customer if a field is missed, or contains invalid information. A combination of the entered information is displayed in an area (1210), so the customer can see that they have entered the right information in the right field.

The customer's details may be already recorded on the database, from previous purchases. An option to assist with this is to provide the customer with a unique identification number. Preferably a secret password would be required, when using this to reduce mistakes. The details of the identification number may be emailed to the customer, or a printed receipt may be provided. Alternatively, the credit card or other payment method may be used to trigger a default set of customer details, or else the customer's telephone number or name or combination of these may be used. But it may be preferred to have the customer key in their identity and address details with each use of the kiosk, to minimise the need for the customer to keep track of their user details.

TABLE 9

| Legend | Item | Description |
| --- | --- | --- |
| 1202 | Country | Country dropdown |
| 1204 | State/Province/Area | State/Province/Area dropdown |
| 1206 | Suburb | User's Suburb |
| 1208 | Post Code | User's Post Code |
| 1210 | Street Address | Users Street Address |
| 1212 | Error Indicator | Visual indicator of whether field has passed validation |
| 1214 | Continue Shopping Button | When selected: Forces validation of current screen If validation successful goes to Home Screen |
| 1216 | View Cart Button | When selected: Forces validation of current screen If validation successful opens Shopping Cart pop-up |
| 1218 | Contact Details Button | When selected forces validation of current screen |
| 1220 | Product Name | Name of product being purchased |
| 1222 | Product Quantity | Quantity of product being purchased |
| 1224 | Product Attribute | Attributes of product being purchased |
| 1226 | Product Cost | Total cost of product being purchased |
| 1228 | Back Button | When selected: Forces validation of current screen If validation successful goes back to previous page |
| 1230 | Next Step Button | When selected: Forces validation of current screen If validation successful goes next step in billing process |
| 1232 | Total Cost | Total cost of order being purchased including shipping |
| 1234 | Delivery Address | When selected forces validation of current screen |
| 1236 | Shipping Method | When selected forces validation of current screen |
| 1238 | Payment | When selected forces validation of current screen |

The customer will use the "Next step" button (1230) to move on to record how they want the goods delivered to them. An example of a screen 1300 for this functionality, to choose the shipping method is shown in FIG. 13. As with the previous screens, a pop-up keyboard is available when a user wishes to enter text in any of the indicated fields. The preferred fields are outlined in Table 10 below.

Using this window the customer will select the shipping method that they wish to use, in order for the purchased products to be shipped to them. A control to allow the selection (1302) among the potential choices is provided. The cost of each method is shown (1304), with a short name (1306) along with a description of the advantages and disadvantages involved, such as the estimated arrival time. A field that permits a message is also available (1310) to allow the customer to provide further instructions when the product is delivered to their door. One of the options may be for the customer to collect some or all of the items in person from the store they are in, and if this option is to be available, then an indicator that the goods are in stock may be provided, or else a means of having a salesperson to approve this, may be provided.

TABLE 10

| Legend | Item | Description |
| --- | --- | --- |
| 1302 | Shipping Method Selector | User delivery method selection. When Selected: Cost of shipping added to order amount |
| 1304 | Shipping Cost | Cost of shipping method |
| 1306 | Shipping Name | Name of shipping method |

TABLE 10-continued

| Legend | Item | Description |
| --- | --- | --- |
| 1308 | Shipping Description | Description of shipping method |
| 1310 | Shipping Message | User message with any shipping instructions |
| 1312 | Continue Shopping Button | When selected: Forces validation of current screen If validation successful goes to Home Screen |
| 1314 | View Cart Button | When selected: Forces validation of current screen If validation successful opens Shopping Cart pop-up |
| 1316 | Contact Details Button | When selected forces validation of current screen |
| 1318 | Product Name | Name of product being purchased |
| 1320 | Product Quantity | Quantity of product being purchased |
| 1322 | Product Attribute | Attributes of product being purchased |
| 1324 | Product Cost | Total cost of product being purchased |
| 1326 | Back Button | When selected: Forces validation of current screen If validation successful goes back to previous page |
| 1328 | Next Step Button | When selected: Forces validation of current screen If validation successful goes next step in billing process |
| 1330 | Total Cost | Total cost of order being purchased including shipping |
| 1332 | Delivery Address | When selected forces validation of current screen |
| 1334 | Shipping Method | When selected forces validation of current screen |
| 1336 | Payment | When selected forces validation of current screen |

The customer moves on to the next step, where the method of payment is selected. An example of a window for defining the payment method is shown in FIG. 14 at screen 1400. Details of the fields that may be utilised for this are provided in Table 11 below. The total amount for the goods being purchased is shown (1430), and various options for making a payment are also provided (1402), so that the customer can select among them. These may include the option of selecting a credit card, and icons for the various credit cards will be shown to select among. Alternately, the options may include purchasing in cash, which may provide and print out a voucher for the customer to take to a cash register. Any of the commonly used payment methods may be incorporated into this screen.

TABLE 11

| Legend | Item | Description |
| --- | --- | --- |
| 1402 | Payment Method Selector | Used for user to select the particular payment method |
| 1404 | Continue Shopping Button | When selected: Forces validation of current screen If validation successful goes to Home Screen |
| 1406 | View Cart Button | When selected: Forces validation of current screen If validation successful opens Shopping Cart pop-up |
| 1408 | Contact Details Button | When selected forces validation of current screen |
| 1410 | Product Name | Name of product being purchased |
| 1412 | Product Quantity | Quantity of product being purchased |
| 1414 | Product Attribute | Attributes of product being purchased |
| 1416 | Product Cost | Total cost of product being purchased |
| 1418 | Back Button | When selected: Forces validation of current screen If validation successful goes back to previous page |

TABLE 11-continued

| Legend | Item | Description |
| --- | --- | --- |
| 1420 | Next Step Button | When selected:<br>Forces validation of current screen<br>If validation successful goes to Billing Step 5 Screen |
| 1422 | Total Cost | Total cost of order being purchased including shipping |
| 1424 | Delivery Address | When selected forces validation of current screen |
| 1426 | Shipping Method | When selected forces validation of current screen |
| 1428 | Payment | When selected forces validation of current screen |
| 1430 | Total Amount | Total cost of order being purchased including shipping. Should be the same as Total cost |

The customer then moves on to the next, and fifth, step, where the payment is processed. Examples of the fields that may be utilised in this screen 1500 of FIG. 15 are shown below in Table 12. Generally, the selected payment method is highlighted (1502) and a progress bar (1504) will graphically indicate the processing time occurring. The total amount involved will also display (1506). If the payment is refused, for example if the credit card check does not permit further costs being incurred by a customer, then an error message would appear.

TABLE 12

| Legend | Item | Description |
| --- | --- | --- |
| 1502 | Payment Method Image | Image of payment method selected by user |
| 1504 | Payment Progress Bar | Displays the progress of the transaction visually |
| 1506 | Total Amount | Total cost of order being processed including shipping |

Finally, a window indicating the payment result will display to the customer, and an example 1600 of this is provided in FIG. 16. A summary of the fields that may be included on the screen is shown in Table 13. A notification (A) that the transaction was successful is indicated. The name of the store where the transaction occurred is shown (B) and the client may be invited (C) to have themselves added to a mailing list for further shopping information to be provided to them, using the email address previously provided. The user clicks on the "Finished" button to return to the home screen. If desired a receipt may be printed, or else a copy may be emailed to the client at the address previously provided.

TABLE 13

| Legend | Item | Description |
| --- | --- | --- |
| 1602 | Email Address | Users Email Address entered in Contact Details |
| 1604 | Store name | Name of store user purchased from |
| 1606 | Subscription | Enables user subscription |
| 1608 | Finished Button | When clicked go to Home Screen:<br>If user has selected Yes to subscribe, subscription process kicked off |
| 1610 | Order Complete | |
| 1612 | Total Amount | Total cost of order being processed including shipping. |

The example shown is merely one variation of an interactive kiosk and the associated software. Other variations may be used equally.

As mentioned, a language translation module is a preferred embodiment of the invention. Also, provision may be made for customers who have trouble seeing or hearing. This can involve a button to expand the size of the details shown on the screen. An earphone jack can be provided with the screen to enable a customer to connect earphones, along with a volume control, to allow any spoken information or advertising to be played more loudly, if desired. A function to permit integration with hearing aids is also possible. The facility to have the text displayed on each screen spoken to the user is also an option, using existing software to enable this function.

As a further preferred option, the system may provide a tutorial to the customer using the display. This tutorial may be a video explaining the functions of the kiosk, or else individual short videos may display explaining each window, or function. These tutorials may be triggered using the "Help" control on the windows, or via a separate button and system.

Another preferred option is to provide tutorials or infomercials via the display about the products to which the kiosk relates. For example, when a cooking implement is purchased, then at the end of the shopping process, a short demonstration may be provided to teach the customer how to use it, or clean it, or care for it, as just some examples. Generic tutorials or advertisements may also be shown about the products to the customers.

As yet another preferred option, there may be tutorials provided on the display directed to the shop assistants. These types of tutorials may involve the use of hidden controls, or security enabled controls. Alternatively, these tutorials may be made available when each shop assistant enters their name identification details. Or else, these tutorials may be available only at times when the store location containing the kiosk is closed to customers. The aim of these tutorials is to train the sales assistants about the products on display in the kiosk. Information about the range of products or about new models can be provided to the sales people. The goal to update the product knowledge of the sales staff can be enhanced by using the interactivity, and so, for example, multiple choice tests about the products can be provided to test their knowledge. If the sales staff log into the database using their identity details, the results of the tests can be stored, and bonuses or prizes can be awarded to staff who learn the best, for instance.

The third feature of the system is the connection of the interface utilised in the kiosk to a database. All the information displayed on the screen about the products, as described above, is held in the database. The database may be maintained locally, on an individual computer unit for each kiosk. But most preferably the database is centrally located, and the kiosk is linked to the database via communication lines, such as over the internet. The data captured from the customers is also added and held in the database.

Any suitable database may be utilised, along with the software to manage and maintain it. The access, security, updating or adding or deleting of data is managed by software programs, created using conventional means. Each separate database will preferably utilise the same architecture, although some types of products may warrant extra or special features that may not apply to the basic system, in which case variations of slightly different architectures may be maintained.

A centralised database for each kiosk brand owner and retailer is preferred. However, combining the data from different brands and retailers may be used, provided that attention is paid to security and suchlike. But providing a separate database holding the data of a specific brand owner, for the products of common kiosks is advisable.

The centralised database system permits an easy and rapid updating of the catalogue of products being displayed in the kiosk for the invention. The database preferably also manages the samples supplied to each kiosk, and the signage and advertising used as well. If a brand owner wants to update their catalogue of products, by adding new models, or replacing one seasons goods with another, then this can be rolled out using the information kept in the database. The new samples and signage can be ordered, catalogued and shipped using the information in the database to each location, and once the sales assistants in each location signal using the touchscreen that these have been put on display for the customers, the catalogue of products can switch over immediately. The tutorial function for sales staff may also be utilised to show the sales staff how to update and arrange the new samples, and signage, for instance.

The database also maintains details that the customers have entered. As well as handling the distribution of payments to suppliers, retailers, and shippers, using conventional accounting procedures, this source of data can be mined, to assist in the sales effort.

The centralised database may also be used to group kiosks into categories, and alter the prices for products for those groups that meet specified criteria. For example, kiosks selling boating supplies may discount their prices when the weather in the locality of the kiosk is cold and rainy.

The kiosk system for the invention may especially be used in the retail arena to stock rarely purchased items in a store that sells those products. For example a liquor store will be selling popular brands of wine and beer. Kiosks can be provided linked to a warehouse that holds rare and expensive wines. Such wines are uneconomic for the storekeeper to stock, as their demand is low, and the wines can spoil if not kept in the right environmental conditions. The rare customers wanting to purchase these rare and expensive wines can do so from the kiosk, which is linked to the warehouse, from where the wines can be dispatched to each customer. Part of the payment received may be provided to the retailer, in return, to allow a profit to be obtained by providing the kiosk at their location.

Alternatively, another preferred use for the kiosk system is to expand the goods available to purchase in a store that sells a narrow range of goods, to other linked goods that the store keeper has no desire to stock, but which their customers may wish to purchase along with the main product they obtained from that store. For example, providing bed linen via a kiosk, at a bedroom furniture store would work like this. Again, some money from each kiosk purchase can be fed back to the store owner.

In a further embodiment, the retailer is able to easily provide discounts against an item or a group of items. In more detail, the retailer has the ability to discount products to assist in sale closure so that a product or group of products may be sold, set discounts against a category and all underlying sub-categories by specifying percentage, set discounts against the accessories for a category and all underlying sub-categories by a specified percentage, set discounts at a user item level by a percentage or dollar amount for a core product and/or accessories, set new recommended retail product amounts for core products or accessories, show or hide products or categories, and set filters to restrict searches allowed.

Turning to FIG. 17, there is shown an example screen 1700 which displays a group of core products, where it is possible to assign a discount to one or more products simultaneously. At FIG. 17A there is shown an example screen 1702 of a confirmation screen where a user has applied a flat 10% discount to a category of products and the system asks for confirmation that the group discount should apply to all products in the category.

Similarly, at FIGS. 18 and 18A there is shown examples of similar screens 1800 and 1802 for accessories and for other discounted products respectively.

Turning to FIG. 19, there is shown an example of a screen 1900 which allows a user a list of "disabled" products. These are products which are not visible to an end user of the system.

Turning now to FIG. 20, there is shown an example of a system screen 2000 which allows a user to interact with an employee to receive a further discount. This system provides particular use where, in a retail environment, the retail store wishes to secure some form of interaction with a physical salesperson, to thereby attempt to create more rapport with the customer. In other words, the system provides a dual interface which allows both a salesperson and a user/customer to interact.

Turning to FIG. 20, there is shown an example of a login screen 2000, so that an employee of the retail store may log into the system.

At FIG. 21, there is shown an example screen 2100 where the employee can review the items that have been selected by the customer.

At FIG. 22, there is shown an example screen 2200 employee may then add a discount or modify the price of the items to create a new final price.

Referring now to FIG. 23, there is shown an example screen 2300 of an interface for a "SmartBasket"™ which allows a salesperson (i.e. an employee of a retailer) to view various aspects of an uncompleted live shopping basket. In the context of the present specification, the term "Smart-Basket" is utilised as a descriptor for the embodiment described herein. It will be understood that this term is utilised by the Applicant as a trade mark and use of the term in the context of the specification does not provide an implied license to use the term to identify other similar embodiments of systems, methods, etc. which incorporate a similar functionality. In the context of the embodiment, the term "live" refers to a shopping basket where a customer (or potential customer) is currently considering making a purchase by virtue of the fact that the customer has expressed an interest in purchasing goods and/or services by placing at least one "item" (which represents the goods and/or services) into the live shopping basket, but has not yet agreed or proceeded to pay for the goods and/or services.

As can be seen generally at area 2302, the retailer is provided with a list of live shopping baskets (which represent pending and/or potential orders) and can review any one or more of the baskets that are saved and being held by a customer (an example of a live shopping basket being shown generally in area 2304). Included in all pending and/or potential orders 2302 are live and also abandoned baskets, including all baskets that are currently open and where a customer is actively adding items to the basket and all baskets where it appears that the customer is no longer actively interacting with the live shopping basket. In this manner, a retailer can see a customer's selection in real-time as the customer browsers the kiosk, but can also review orders that customers have appeared to have abandoned, which may yield relevant information about a customer's interest in the goods and/or services.

It will be understood that in this embodiment, the Smart-Basket™ can also be displayed on a hand-held device (such as a tablet computing device or a smartphone) or may be accessed by a user via a website on a remote computing system, such as a personal computer. Where the SmartBasket™ is utilised on a hand-held device or via a web-site, the device and/or the web-site may be in communication with the kiosk (via a Wi-Fi, Bluetooth or other connection) or may independently connect to a remote server (bypassing the kiosk). Such variations are within the scope of the embodiment and broader inventive concepts described and defined herein.

Returning to FIG. 23, at area 2306 there is shown a series of "associated products" which are potentially viewable only to the retailer and/or salesperson. The retailer and/or salesperson may review the cost price of the accessories and may offer the accessories to the customer at a discounted price or at a nil sum in order to entice the customer to complete the sale. This process may occur as part of a "face to face" negotiation (i.e. the customer and the salesperson are both located adjacent the kiosk), or it may occur as a "virtual" negotiation (i.e. the customer and the salesperson are both located at respective remote devices, such as tablet computing systems, smartphones and/or computing systems/terminals).

In other words, the retailer and/or salesperson, by monitoring the customers decision in real-time, may predict the behavior of the customer and may provide incentives to entice the customer to purchase an item. In this manner, there is provided a hybrid sales methodology and system, where a customer interacts predominantly with an electronic interface, but a live salesperson can monitor the progress of the sale and utilise traditional sales techniques to complete a sale either remotely via the interface of FIG. 23, or in person with the customer.

The completion of the sales process is facilitated by to the interface 2400 of FIG. 24. At FIG. 24, there is shown a screen 2400 where a retailer may view a retail price for the product 2402 and may also view competitor prices generally shown at 2404. Conveniently, this allows the retailer to scan other prices available on the Internet for the product and then manually adjust the price accordingly, and make the price shown to the consumer more attractive.

In an alternate embodiment, such price adjustment may be performed automatically, through use of an appropriate algorithm. In addition, at 2406 there is shown a messaging function which allows the retailer to contact the customer and alert the customer to the fact that the price has been lowered in order to match the price of a competitor. The messaging interface therefore operates to entice the customer to remain and complete the purchase. Once again, this demonstrates the use of a hybrid sales technique, which allows the retailer to provide the customer with an electronic "low pressure" sales environment, while also allowing a salesperson to intervene and drive the sales process in order to close the sale. As such, the interface and the hybrid model integrate the best elements of both an online sales portal and a traditional offline "face-to-face" sales technique.

Turning to FIG. 25, there is shown a supplier competitive performance report at 2500 which can be generated for review by a retailer. The report highlights the number of instances a supplier's product has been discounted to meet market pricing and the dollar amount of the discounts needed to secure sales. As such, the retailer can use such information to determine whether pricing structure is correct or to identify specific competitors.

Now with reference to FIGS. 26A through 26P, there is shown a user (i.e. customer) interface for use on a smartphone. The customer interface shown generally through FIGS. 26A through 26P provides a live shopping basket that can be readily accessed by the customer for review. The smartphone app shown in FIG. 26A through to 26P may be viewed as an "extension" of the interface described more generally in the present specification.

That is, the interface at FIGS. 26A through 26P may be used by a customer independently of the kiosk or alternatively, may be used in conjunction with the kiosk. The SmartBasket™ can be created from a kiosk on the shop floor or from a retailer's website. Once the SmartBasket™ is created it is available and can be reopened on any other device at any time.

For example, a customer may be encouraged by a retailer to create a basket by using the website (rather than the kiosk on the shop floor). That is, the customer may perform some preliminary shopping at home (away from the store) to narrow down the products and services they are interested in, and may then arrive at the store to gather more information about the product and/or service. When the customer enters the store they may seamlessly interact with the interface on a kiosk. This occurs by assigning a unique identification code to each basket created by a customer. This unique identification code is utilised by the kiosk to immediately identify the relevant basket when the customer interacts with a kiosk or another device (separate from the device which created the basket).

For security reasons, the customer may also need to enter a further unique identifier such as an email address or a telephone number, to prevent customers accidentally accessing incorrect baskets (due to, for example, keying in an incorrect basket number). When the customer logs into a kiosk, the retailer may be immediately alerted to the fact that the customer is now physically in the store; and this information may be used to provide notification of offers, discounts, price changes, items out of stock and any other messages pertaining to the current basket selection. Again, the provision of such information is intended to assist in the closing of a sale.

The basket also includes a number of additional features which are listed below and which are described with reference to FIG. 26A through to 26P:

Identification of basket—when a basket is created from a kiosk or web site it is allocated a basket number which incorporates a supplier code so the basket can be linked to both the customer and the supplier if it is on a retailers' site that contains more than one supplier. As shown in FIG. 26A, to access this basket the customer must enter a unique customer identifier 2602, which maybe either an email address or phone number.

Login screen—originally the basket is accessed through a link that is sent at the time of creation of the basket from the web site or kiosk from where the basket originated. Once this link is activated the basket is opened at the login screen. To re-enter a basket that is existing the customer enters the web address of the retailers SmartBasket™ website and then logs in with their unique identifier, such as an email address or telephone number, as shown at 2606 in FIG. 26C, which leads the customer to a list of the baskets they currently have with that retailer, as shown at 2608 in FIG. 26D.

Notifications—at any time the retailer (owner of the original kiosk or website where the basket was generated) can send directly to the basket, or to the mobile telephone number (via SMS) or email originally provided by the customer, notification of offers, discounts, price changes, pending out of stocks or any other message pertaining or not pertaining to the current basket selection, as shown at 2604 in FIG. 26B.

Cart View—the basket selection can be viewed via a number of different formats such as swipe, scroll or index cards etc. (subject to suitability to product category), as shown at 2610 in FIG. 26E. Alternatively, the entire catalogue can be accessed to add product not previously considered.

Product View—an individual product can be viewed and variants, such as size or colour, can be changed, as shown at 2612 in FIG. 26F.

Product View Mid Page, Accessories—scrolling down from top of product page reveals all accessories associated with that product not only those previously selected, as shown at 2614 in FIG. 26G. Accessories can be added or those previously chosen can be deleted.

Product View Bottom Page, Competitive Price Assurance (Optional)—once a SmartBasket™ is created in any of the above mentioned ways, the SmartBasket™ is able to scan other Internet prices of the goods in the basket. These are visible at the bottom of the Product View page, as shown at 2616 in FIG. 26H. The retailer may set a business rule to match the lowest competitive price or any other business rule, as appropriate.

Automatic Discount offer—through a number of retailer defined business rules the retailer may offer a discount once a predetermined dollar gross margin or other measure of value of the basket is reached. These offers may also be triggered by information acquired by the scanning of competitors' prices. The customer is made aware of this new discount or promotional offer via a pop-up on a kiosk, via their mobile SmartBasket™ or via SMS or email.

Check Market Price Refresh—the SmartBasket™ can be set to check the market price of goods in a basket at regular intervals automatically. At the time that a consumer is about to confirm a purchase they may use the check market price button to refresh the current prices listed, as shown at 2618 in FIG. 26I.

Billing Confirmation Cart—once the customer decides to complete the purchase they are able to check their final selection through the confirm cart screen, as shown at 2620 in FIG. 26J. Products are grouped with their associated selected accessories. Scrolling down reveals the total due applying any discounts or offers that have been taken up, as shown at 2622 in FIG. 26K.

Contact and Delivery Details—the customer then proceeds to populate the delivery detail screen with the relevant details, as shown at 2624 in FIG. 26L. If details have been previously entered by the user they will be automatically populated with an option to be over write all or some fields.

Shipping Method—various options for shipping and delivery can be chosen from the Shipping screen, as shown at 2626 in FIG. 26M.

Billing Method—payment options are available through the final payment method screen, as shown at 2628 in FIG. 26N. This would include a "pay at counter" option for in-store basket transactions.

Figure 26O:
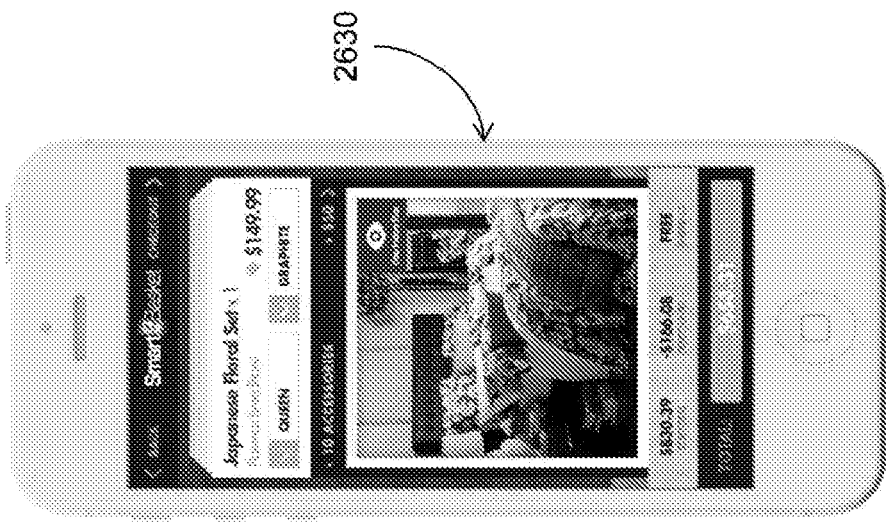

Wayfinder—SmartBasket™ is able to create a "wayfinder" floor plan for the customer to use for self-selection of goods in the basket (as shown at 2630 in FIG. 26O) throughout a physical store or shopping centre, automatically shown through a printed map, electronic map, or talking directions. This can be created on a store kiosk or web site or mobile handheld device, as shown at 2632 in FIG. 26P. It is activated through a View In Store map button on the product page and can also talk you through the store to the goods in your basket/shopping list.

My SmartBasket™—is a smart basket that is created by the consumer and not attached to any one retailer. The consumer can enter any product from any web store or combination of stores.

Competitive Price Assurance—as with the retailer held SmartBasket™ once the basket is created it is able to automatically scan other internet prices of the goods in the basket at predetermined intervals. It can then alert the customer of the availability of a superior offer and/or automatically replace the existing item with the newly found, more competitively priced item.

Invite Bids—My SmartBasket™ can identify sellers of the goods in the basket and inform them of the required delivery time and place as well as the current "best price". Sellers in turn can bid for the goods or individual items in the basket.

On this matter, the employee and the customer may interact and the employee may then provide the customer with further suggestions and/or "upsell" other products to the customer. As such, this embodiment of the retail system provides a hybrid retail system which mixes a traditional "salesperson-client" relationship with an online retailing model.

ADVANTAGES AND INDUSTRIAL APPLICABILITY

The invention can be utilised in the retail industry or in any other industry where there is a requirement for an interaction between a customer and a salesperson.

The invention, in at least one embodiment, is a retailing system for selling products, such as a multiplicity of goods and/or services, where the system involves the combination of a physical interactive retail kiosk, in association with a display of samples, and the kiosk also being connected with a database that stores information about the products, and from the customer interaction permits the selection, purchase and shipping of the products to the customer. The information displayed by the kiosk, and the interaction from the customer in making the purchase comes and goes to and from the database system. The products can be sourced from a brand owner. Alternatively or in addition they may be sourced from a retailer.

This system utilises the advantages of online retailing, because the kiosk has a display for showing digital representations of the wide variety of goods or services that are then available to the customer for purchase. Customers can browse or search through any or all these products, and they are able to select any that they want to buy from a full electronically maintained catalogue. The goods are then shipped from a warehouse to the customer once the customer enters their identification details and attends to payment and records where the goods or services are to be delivered. The customer's habits in viewing the products can also be utilised for later analysis to help with product marketing and development, for example. The kiosk can also provide useful information about the products or the brand owner to the customer for future use.

The system also takes advantage of allowing the customer to see and handle samples of at least some of the products available for sale via the kiosk. The sample display is located adjacent to the touch screen for displaying and allowing the purchase. Letting the client inspect a physical sample of the items would increase retail success. Preferably the kiosk is located within a physical retail environment such as a store, which gives a salesperson access to the potential client. This can increase sales and also provide other intangible benefits to the retailer by making the client more satisfied with the products they are buying, and feeling that they have received sufficient personal attention. These intangible effects are normally lacking with online retailing.

The retail kiosk will often takes up less floor space in a store where it is located than for traditional shopping, where the retailer must maintain sufficient supplies of the goods for when they are purchased, or lose the sale. This helps lower costs and increases retail margins, or allows a reduction in retail pricing. As another option, the retailer may retain stocks of the products available for purchase via the kiosks, and operate a hybrid system, by directly supplying goods to some purchasers who wish to have the goods immediately, but allowing other purchasers to obtain the home delivery of the goods if they do not want to carry the goods around with them, or if the actual goods being purchased are not in stock.

Unlike a website, the range of products displayed on the kiosk can be customised to reflect the range selected by the individual retailer to be presented to their customer base. With the approach taken in the embodiment described, the kiosk owner can tailor the goods or services to the location, appealing to the type of customers who frequent the location, and be guided by feedback received from a sales assistant who may be present.

The ability provided by the embodiment to highlight associated accessories when a customer views a particular product encourages increased sales. In a traditional store, the accessories or associated products are commonly found in a different part of the store. With the embodiment, when a specific item is chosen, the system then can display its accessories, or linked items, which a customer can then select the same time. This also lets a customer easily customise their accessories to the main product by selecting the best colour and size, for example. In a traditional store these accessories are commonly purchased separately, and the customer often forgets the details of the main product, and so may not find the best accessory that is available, or may not get around to buying the matching accessories at all.

The embodiment also helps reduces pilferage from the store as large amounts of stock no longer needs to be kept on the shop floor, thereby reducing the opportunity for shop lifting.

Due to the reduction of space and capital requirements for the system of the invention, it enables sales to be generated through new retail distribution channels that are complementary to a product that is traditionally being sold in the store. For example, a kiosk for selling bed linen may be made available through bed or furniture stores.

In at least one embodiment, the invention provides a user interface that works in conjunction with samples of the stock displayed on the shop floor. This retail system advantageously allows the consumer to touch and feel the products available, then select, and if needed accessorise the chosen product, by means of an intuitive touch screen interface, or the like. Additional promotional information or special offers, or similar material, may be presented to the customer during this process. The purchase is then made, preferably utilising a kiosk credit card reader or similar method, which then preferably generates an order to the supper and then may also allocate funds to a holding account.

In the embodiment that includes a kiosk, the kiosk can generally be associated with a wide and varied range of retail environments, covering a variety of product types. In a preferred arrangement each kiosk may relate to products sourced from a brand owner, and located in a retail outlet for a separate retailer especially one retailing related products, although other arrangement may also apply. For example, a kiosk displaying and retailing bed linen of a specific brand may be located in a retail establishment selling beds and bedroom furniture.

Disclaimers

Throughout this specification, unless the context requires otherwise, the word "comprise" or variations such as "comprises" or "comprising", will be understood to imply the inclusion of a stated integer or group of integers but not the exclusion of any other integer or group of integers.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

It will also be appreciated that where methods and systems of the present invention and/or embodiments are implemented by computing systems or partly implemented by computing systems then any appropriate computing system architecture may be utilised. This includes standalone computers, network computers and dedicated computing devices (such as field-programmable gate arrays).

Where the terms "computer", "computing system" and "computing device" are used in the specification, these terms are intended to cover any appropriate arrangement of computer hardware for implementing the inventive concept and/or embodiments described herein.

The invention claimed is:

1. A retailing system for providing interaction between a customer and a retailer to assist in the completion of a sale, comprising:
   a graphical customer interface incorporated in an interactive kiosk, the kiosk including a plurality of removable display modules arranged in fixed proximity to the graphical customer interface and further arranged to display samples of at least one of a plurality of merchandise items to a user such that the user can directly interact with the merchandise items and the customer interface, the graphical customer interface being in communication with a local database arranged to store merchandise information regarding the plurality of merchandise items and provide the merchandise information to the graphical customer interface to display to the customer the information about the merchandise items; and
   an input module located proximate to the interactive kiosk and arranged to receive input regarding a potential sale of at least one of the merchandise items from the customer for provision to a remote computing system via a communications system, the remote computing system including a processing module arranged to receive the input and save the input in a database of customer information;
   wherein the remote computing system is arranged to provide the input from the customer to a first remote device associated with the customer and a second remote device associated with the retailer via the communications network;

wherein the input is saved in the first remote device associated with the customer and is utilized by the second remote device and the computing system to undertake a further action to assist in the completion of the sale; and wherein the further action taken by the computing system includes the processing module accessing information to review at least one other remote database containing price information for the at least one item and revising the price of the at least one item based on the information and communicating the revised price information to one or more of the graphical customer interface and the first remote device.

2. The retailing system recited in claim 1, wherein the further action includes communicating an alert to the second device, the second device including a retailer interface viewable by at least one other user associated with the retailer and in the physical vicinity of the kiosk.

3. The retailing system recited in claim 2, wherein the retailer interface is arranged to allow the at least one other user associated with the retailer to review the input and interact with the customer via the communications network to assist in the completion of the sale.

4. The retailing system recited in claim 3, wherein the interaction of the at least one other user associated with the retailer with the customer includes manipulating, in real time, the sale price of an item as viewed by the customer on one of the graphical customer interface of the kiosk.

5. The retailing system recited in claim 1, wherein the interaction of the at least one other user with the customer includes communicating at least one incentive to the customer via a graphical user interface associated with the first device in order to induce the customer to complete the sale.

6. The retailing system recited in claim 1, wherein the processing module is further arranged to review present and past input from the customer and process the input to provide analysis information derived from the customer input, wherein the analysis information is utilised to automatically revise the price of the at least one item.

7. The retailing system recited in claim 6, wherein the processing module further accesses the database to retrieve sale information relevant to the at least one item; and wherein the processing module processes the sale information to provide further analysis information, wherein the further analysis information is presented on the retailer interface.

8. The retailing system recited in claim 7, wherein the processing module, in undertaking the further analysis considers at least one of: the gross dollar margin of the potential sale, the number of the at least one item in stock, the quantity of the at least one item sold, and any scheduled ceasing of stocking.

9. The retailing system recited in claim 8, wherein the further action further comprises revising the price of the at least one item to at least match a competitor's price.

10. The retailing system recited in claim 7, wherein the processing module is arranged to access the remote database to review a purchasing history of the customer and conduct the further analysis on the customer's purchasing history.

* * * * *